United States Patent [19]
Satou et al.

[11] Patent Number: 6,101,584
[45] Date of Patent: Aug. 8, 2000

[54] COMPUTER SYSTEM AND SEMICONDUCTOR DEVICE ON ONE CHIP INCLUDING A MEMORY AND CENTRAL PROCESSING UNIT FOR MAKING INTERLOCK ACCESS TO THE MEMORY

[75] Inventors: Mitsugu Satou; Shunichi Iwata, both of Tokyo, Japan

[73] Assignee: Mitsubishi Denki Kabushiki Kaisha, Tokyo, Japan

[21] Appl. No.: 08/850,703

[22] Filed: May 2, 1997

[30] Foreign Application Priority Data

Nov. 5, 1996 [JP] Japan .................................. 8-292642

[51] Int. Cl.⁷ ............................. G06F 13/14; G06F 13/42
[52] U.S. Cl. ....................... 711/152; 711/163; 710/108; 710/200; 710/240
[58] Field of Search ..................................... 711/151, 152, 711/163, 155; 395/726, 728, 730, 288; 710/108, 200, 240, 244, 28

[56] References Cited

U.S. PATENT DOCUMENTS

| | | | |
|---|---|---|---|
| 4,760,521 | 7/1988 | Rehwald et al. | 711/106 |
| 4,807,112 | 2/1989 | Hamasaki | 710/59 |
| 4,858,116 | 8/1989 | Gillett, Jr. et al. | 711/155 |
| 5,170,481 | 12/1992 | Begun et al. | 710/200 |
| 5,251,304 | 10/1993 | Sibigtroth et al. | 711/152 |
| 5,341,501 | 8/1994 | Keeley et al. | 710/200 |
| 5,485,594 | 1/1996 | Foster | 711/155 |
| 5,526,494 | 6/1996 | Iino et al. | 710/119 |
| 5,787,486 | 7/1998 | Chin et al. | 711/152 |

FOREIGN PATENT DOCUMENTS

| | | |
|---|---|---|
| 0 254 960 | 2/1988 | European Pat. Off. . |
| 0 725 349 | 8/1996 | European Pat. Off. . |
| 55-108027 | 8/1980 | Japan . |
| 55-164922 | 12/1980 | Japan . |
| 63-5456 | 1/1988 | Japan . |
| 2-500550 | 2/1990 | Japan . |

OTHER PUBLICATIONS

"Introduction to Transputer", Masaki Yamamoto et al., pp. 9–14, published by The Nikkan Kogyo Shinbun, LTD., Feb. 26, 1990, with English Translation of relevant extracts from the above "Introduction to Transputer" reference.

Primary Examiner—Glenn Gossage
Attorney, Agent, or Firm—Burns, Doane, Swecker & Mathis, LLP

[57] ABSTRACT

A central processing unit (CPU) having a built-in dynamic random-access memory (DRAM) with exclusive access to the DRAM when the CPU performs an interlock access to the DRAM. A memory controller prevents the DRAM from being externally accessed while the CPU is performing the interlock access. When the memory controller receives an external request for accessing the DRAM during a time when the CPU is performing an interlock access to the DRAM, the memory controller outputs a response signal indicating that external access to the DRAM is excluded or inhibited. The request signal can be a hold request signal for requesting a bus right or can be a chip select signal. The response signal can be a hold acknowledge signal or a data complete signal. The memory controller can be switched to and from first and second lock modes, where hold request and hold acknowledge signals are used during the first lock mode and chip select and data complete signals are used in the second lock mode.

4 Claims, 12 Drawing Sheets

FIG. 6(a)   CLKIN

FIG. 6(b)   AF

FIG. 6(c)   /REQF

FIG. 6(d)   /ACKF

FIG. 6(e)   /ENDF

FIG. 6(f)   intD[0:127]

t1 t2 t3 t4 t5

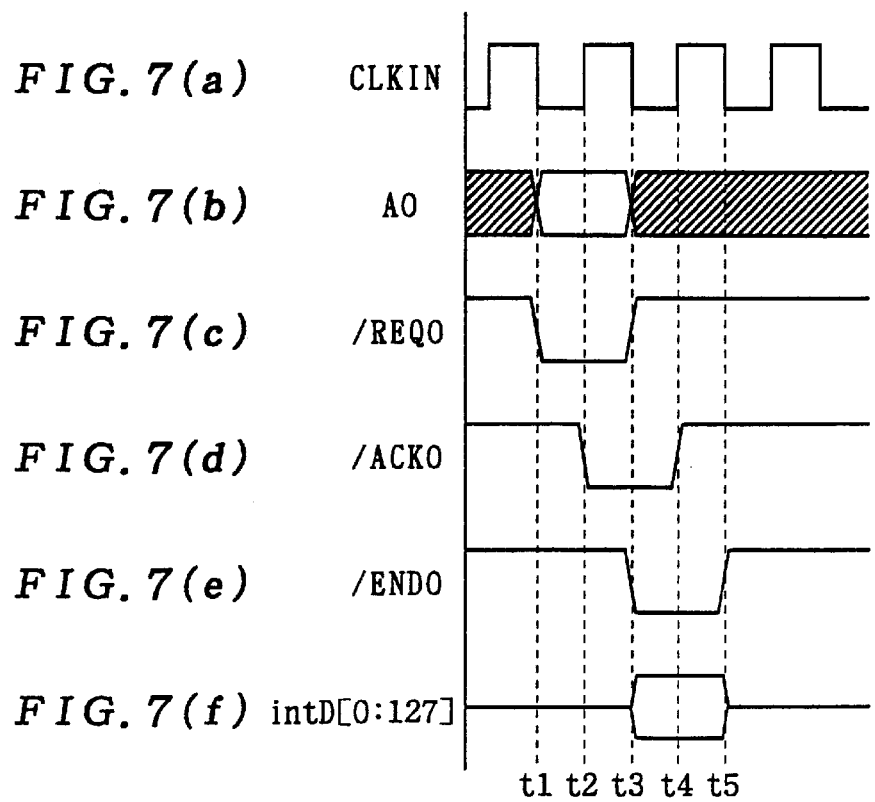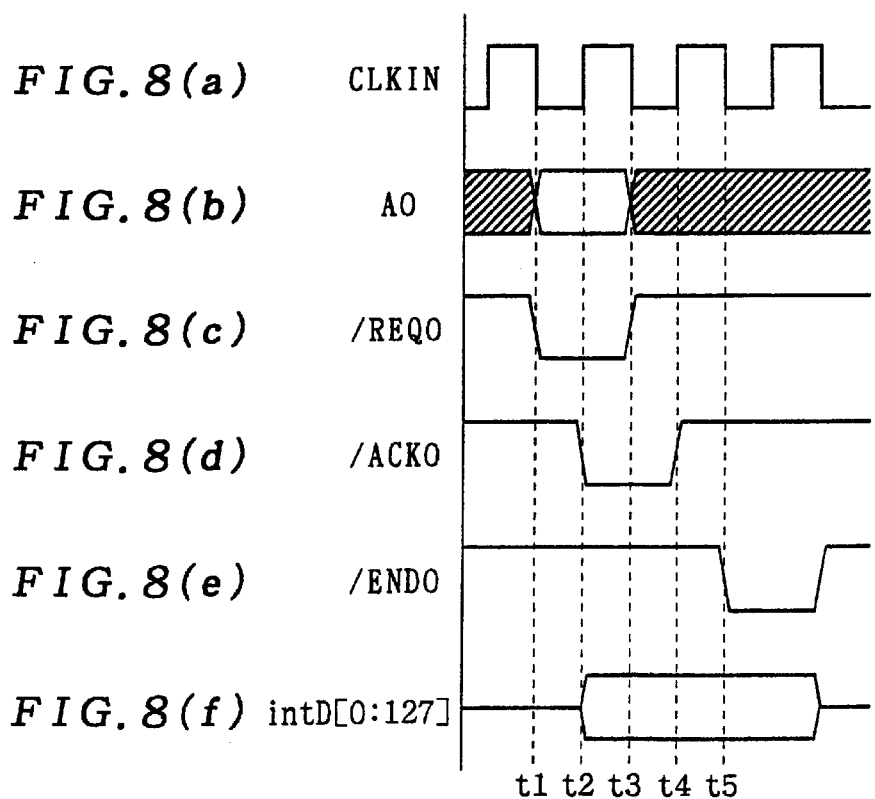

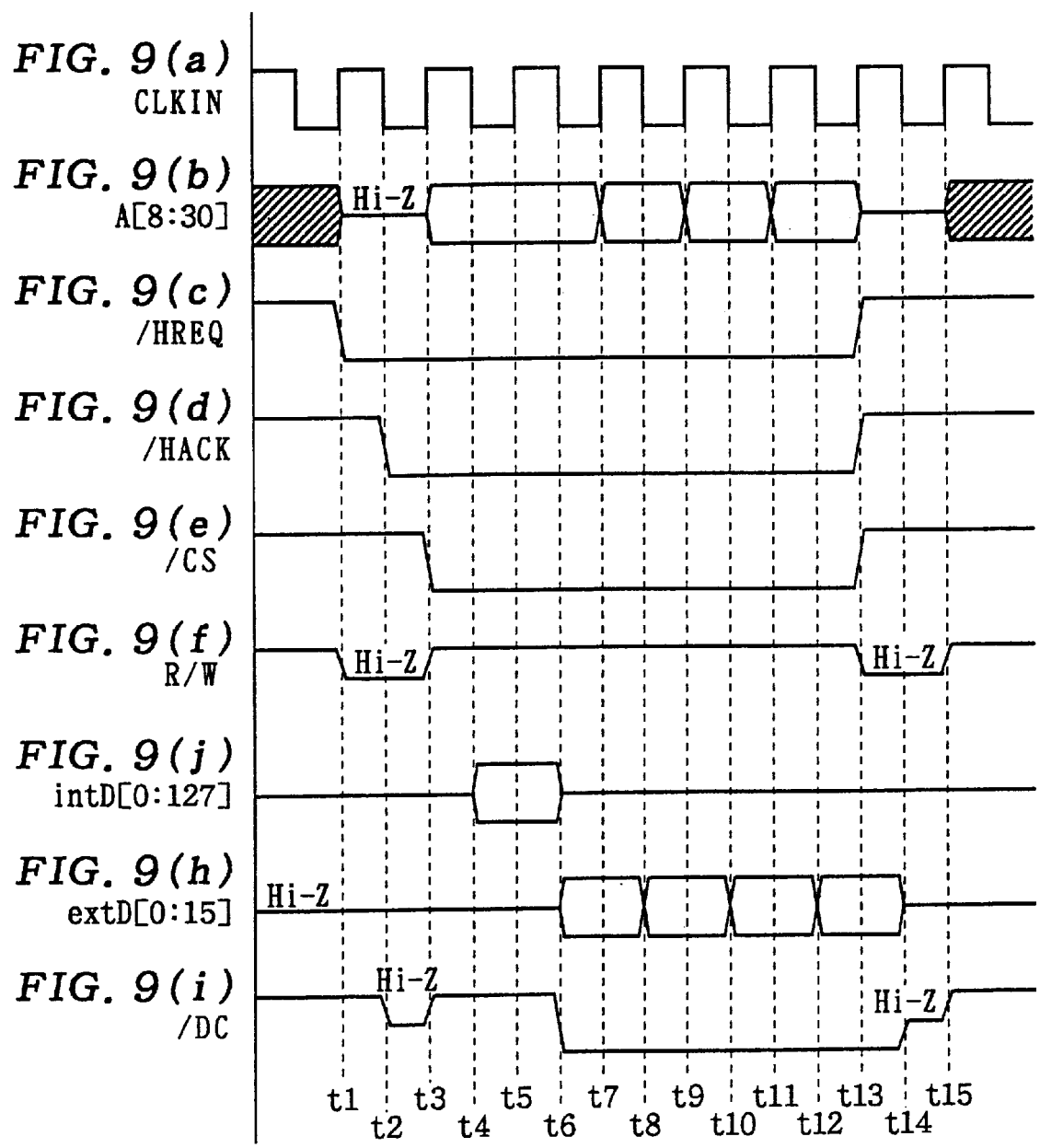

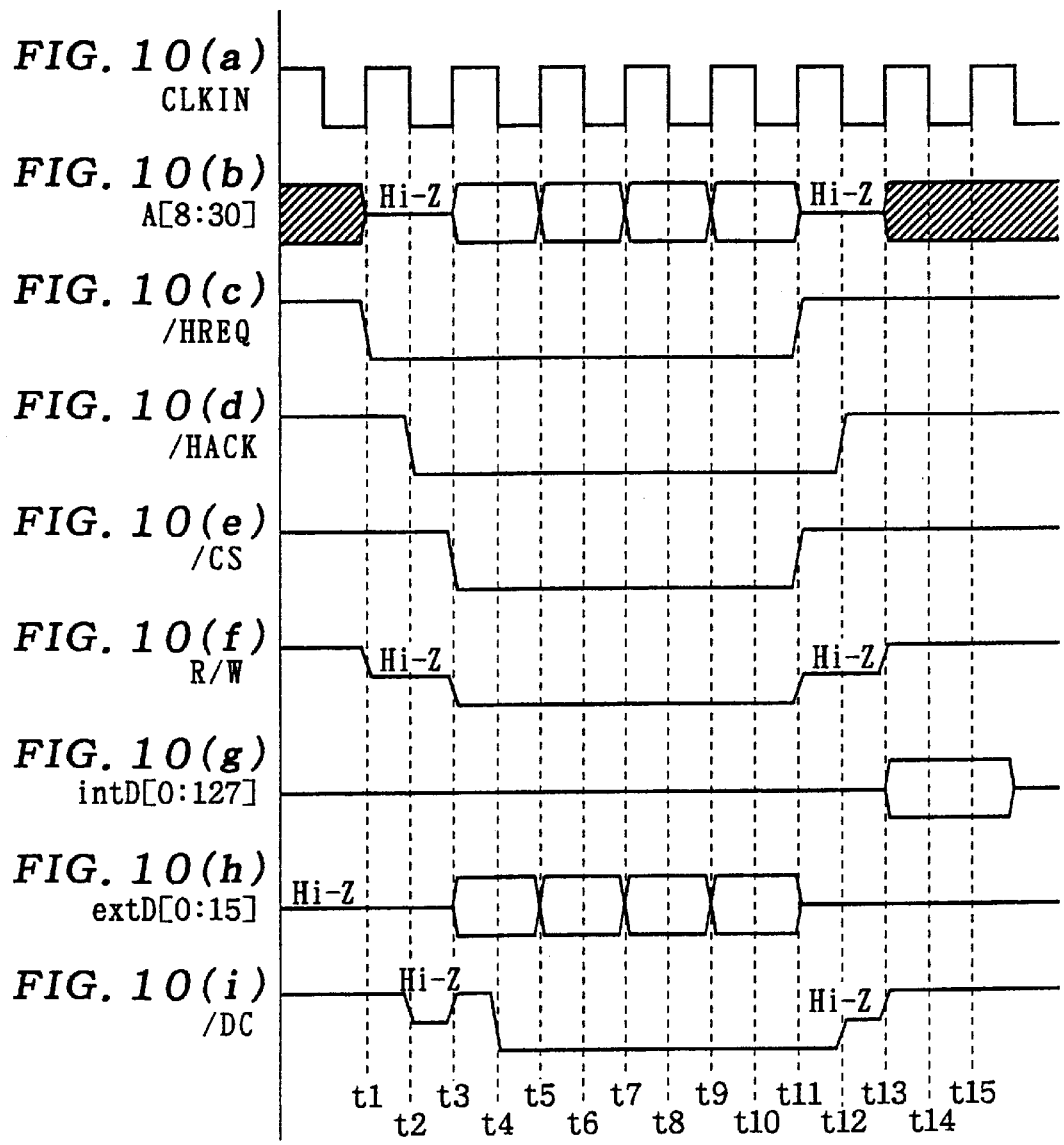

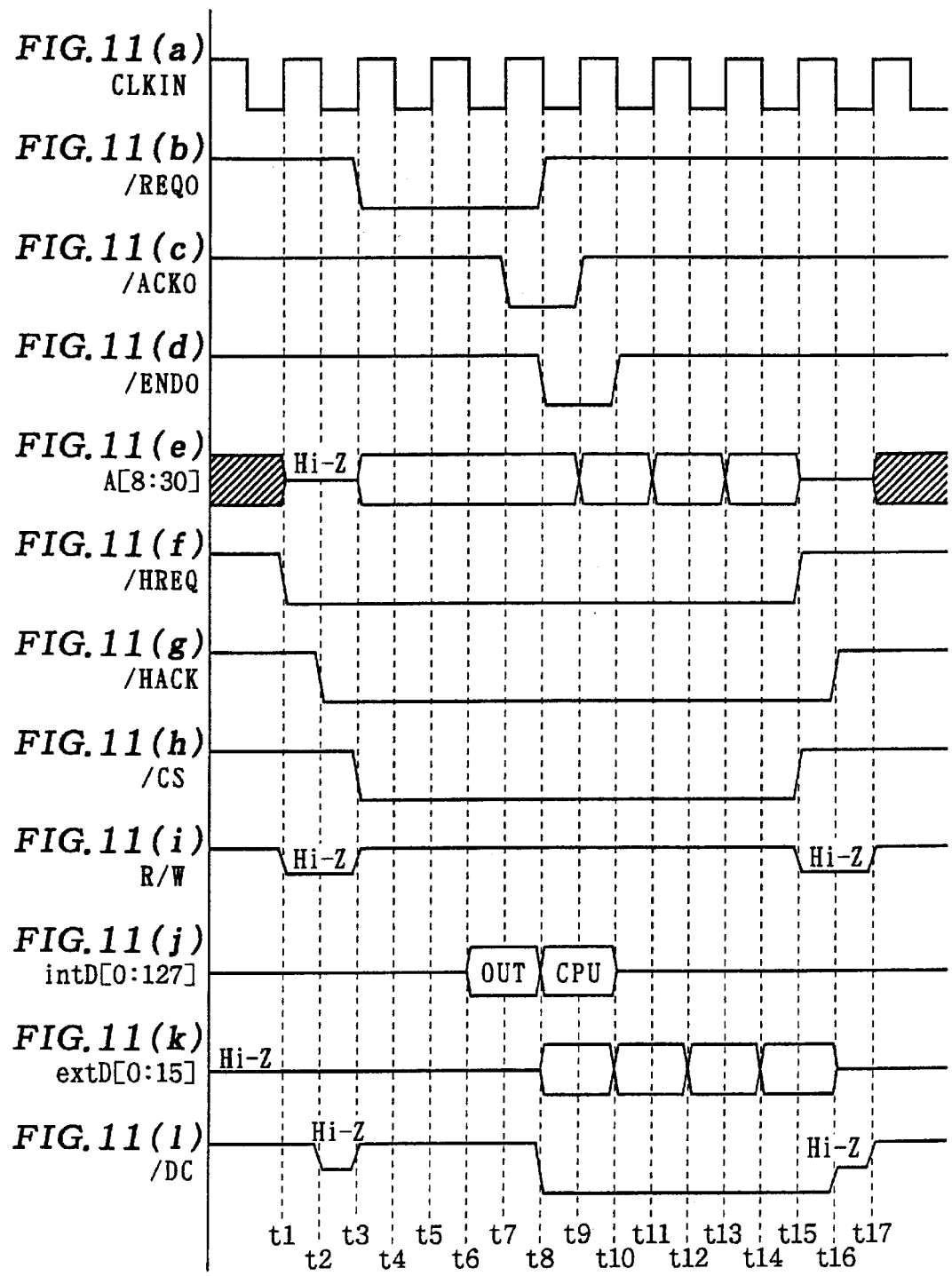

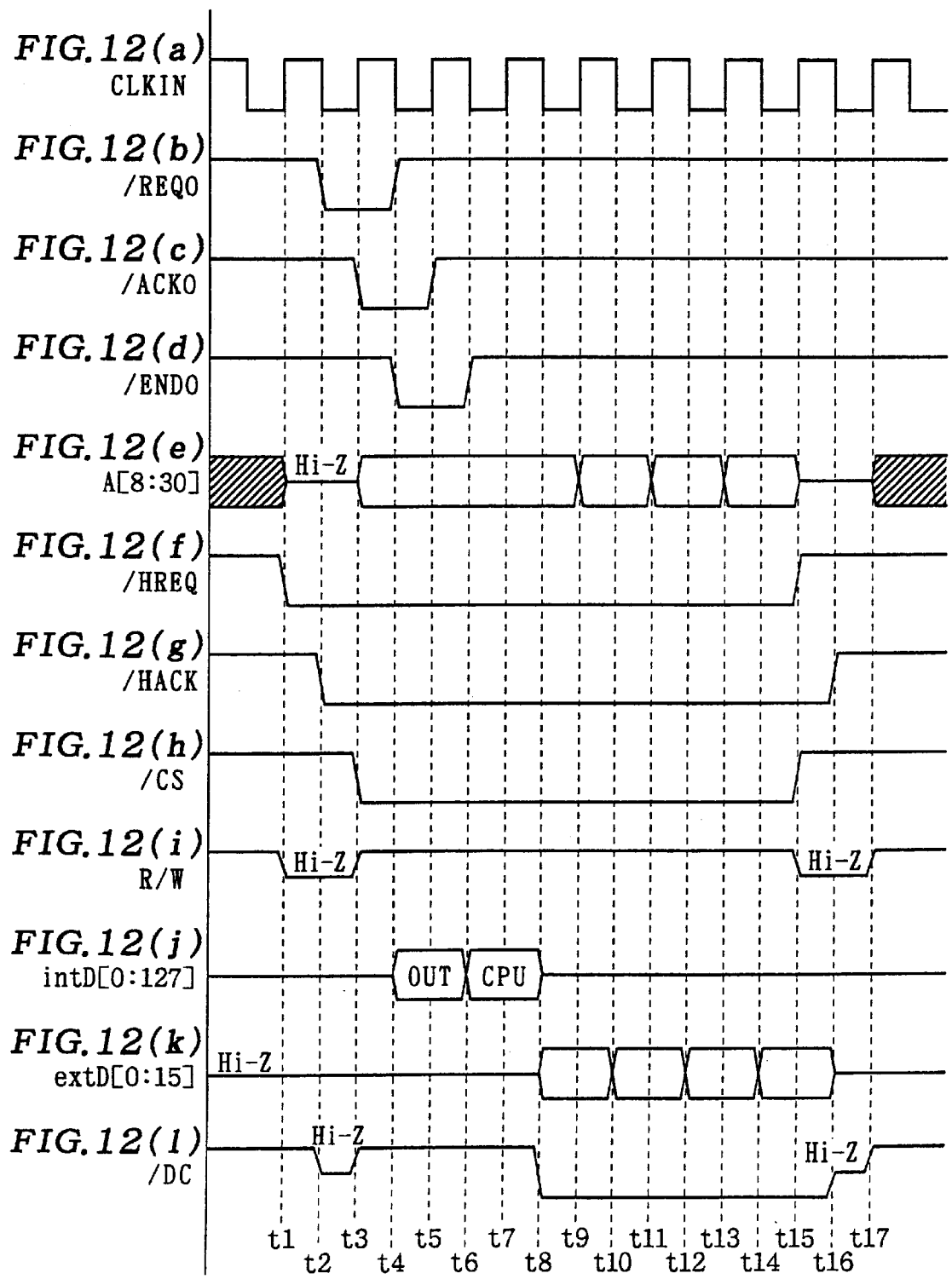

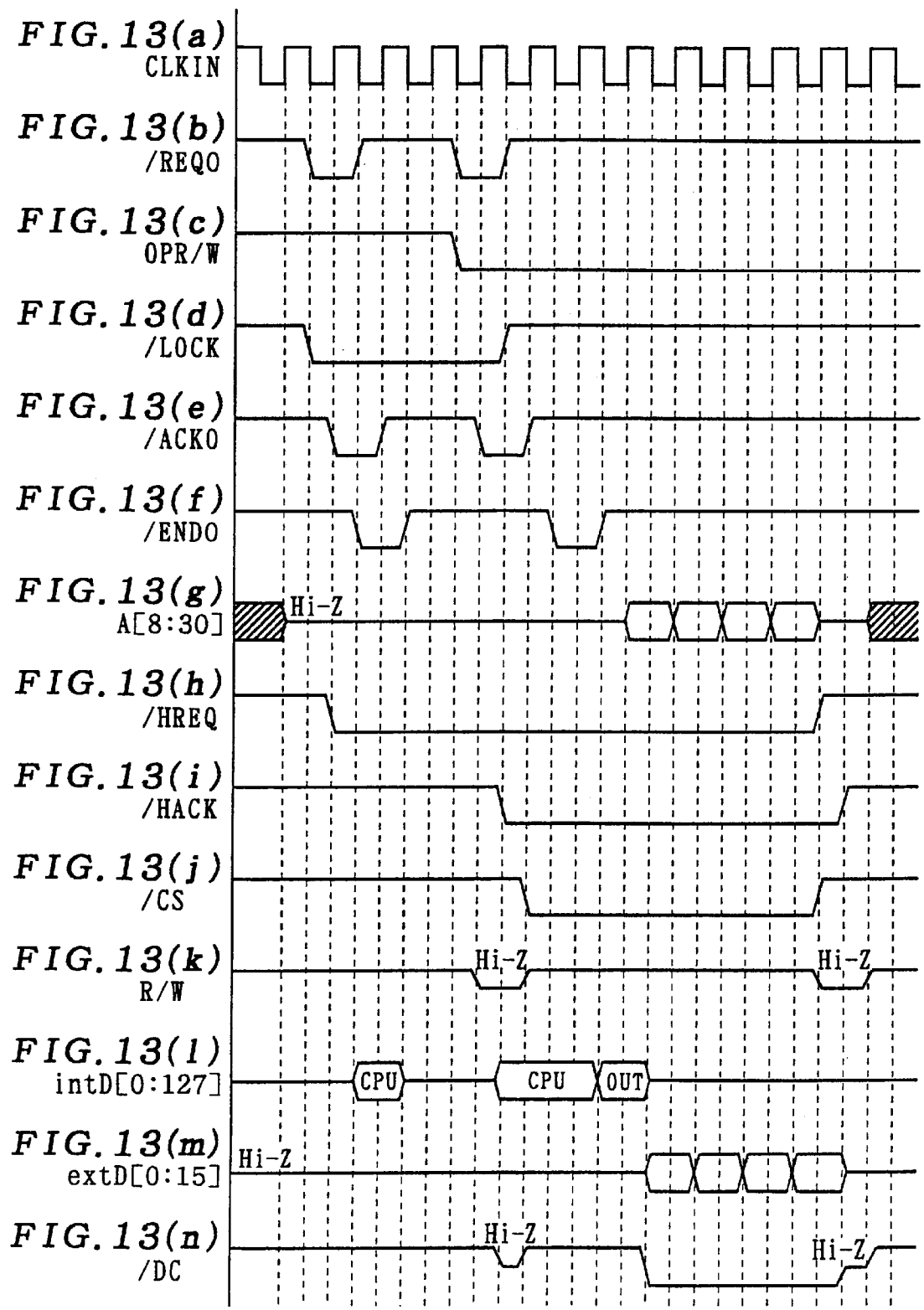

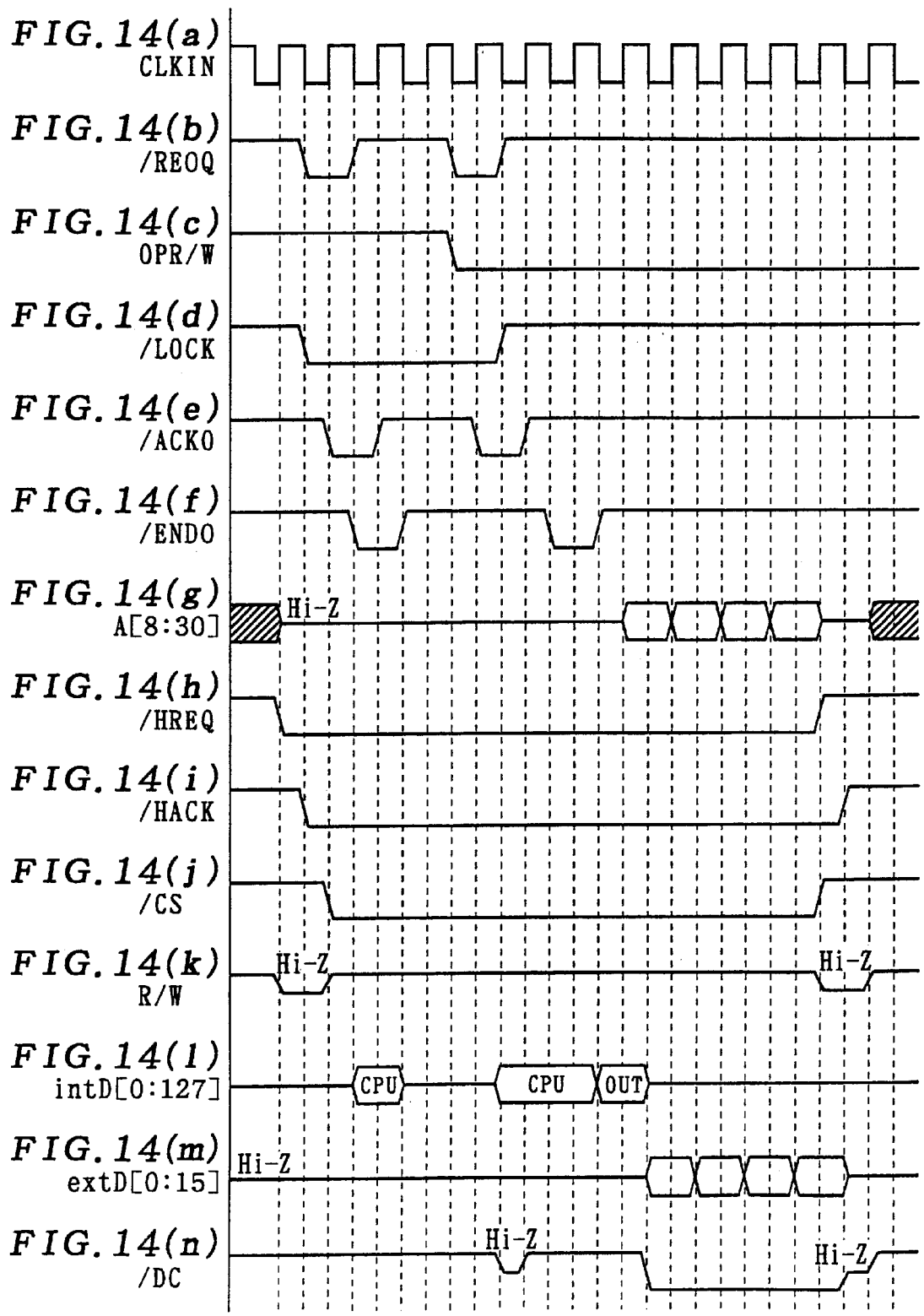

COMPUTER SYSTEM AND SEMICONDUCTOR DEVICE ON ONE CHIP INCLUDING A MEMORY AND CENTRAL PROCESSING UNIT FOR MAKING INTERLOCK ACCESS TO THE MEMORY

BACKGROUND OF THE INVENTION

1. Field of the Invention

The present invention relates to semiconductor devices and computer systems, and particularly to a semiconductor device with built-in memory which contains a CPU (Central Processing Unit) and memory on the same chip and a computer system using the semiconductor device with built-in memory.

2. Description of the Background Art

Systems such as personal computers and work stations have a microprocessor including a CPU (Central Processing Unit) for processing data, and memory for storing data. The microprocessor and the memory are packaged on a board as separate chips, wherein the two exchange data through an external data bus printed on the board.

Such systems include multi-processor systems having a plurality of microprocessors. In a multi-processor system, the plurality of microprocessors share the memory. In the multi-processor system, ordering of processes performed in parallel by the microprocessors is a problem. That is to say, it has the problem of access contention in which a plurality of microprocessors simultaneously access shared resources such as the memory.

Conventional multi-processor systems solve the problem of access contention by utilizing a semaphore. A value of the semaphore indicates that the shared resource is available, for example. A microprocessor which attempts to access the shared resource first reads the value of the semaphore. When it determines that the shared resource is accessible, it modify-writes the value of the semaphore to a new value and obtains the access right to the shared resource. The series of read modify-write access to the semaphore must be performed in an undivided manner (i.e., without being intefered with). That is, if the read and the write are separated, another microprocessor may read, between the read and the write, the value of the semaphore which has not been rewritten yet to determine that the shared resource is accessible, which will result in collision of accesses to the shared resource by the two microprocessors.

The microprocessor, which has obtained the access right to the shared resource through the procedure described above, starts access to the shared resource. On the other hand, the microprocessor which read the value of the semaphore to know that it could not obtain the access right to the shared resource enters a standby state. The values of the semaphore are stored in a memory on a chip separated from the microprocessors in conventional multi-processor systems. Conventional microprocessors have dedicated instructions and external terminals for making interlock memory access for accessing the semaphore by itself while inhibiting access to the semaphore from other microprocessors. While this instruction is executed (for example, while read-modify-write access is being made to the semaphore,) it asserts the external terminal to request an external bus controller to allow the series of memory accesses to be performed in an undivided manner. The bus controller, receiving this request, inhibits access to the semaphore from other microprocessors.

SUMMARY OF THE INVENTION

A semiconductor device according to the present invention comprises, on one chip, a memory for storing data, a CPU (Central Processing Unit) for making interlock access to the memory, and a control circuit for receiving a request signal for accessing the memory from outside the semiconductor device and outputting a response signal to respond to the request signal, the control circuit placing the response signal in a state indicating that access to the memory from outside the semiconductor device is excluded in a period in which the CPU makes the interlock access to the memory.

Preferably, in the semiconductor device, the CPU starts the interlock access when receiving an interlock access instruction and terminates the interlock access when receiving an interlock access terminate instruction.

Preferably, in the semiconductor device, the CPU can make uninterlock access, or in other words non-interlock access, to the memory, the request signal includes a hold request signal that can be used to request a bus right, and the response signal includes a hold acknowledge signal that can be used to give notice that the bus right has been freed. In a time period during which the CPU is making an access to the memory, the control circuit is responsive to the hold request signal. When the CPU is making a non-interlock access to the memory and the hold request signal is at a level that indicates a request for the bus right, the control circuit causes the hold acknowledge signal to be at a response level that indicates that the bus right has been freed. In a time period during which the CPU is making an interlock access to the memory and the hold request signal is at a level that indicates a request for the bus right, the control circuit causes the hold acknowledge signal to be at a different level from the response level to indicate that access from outside the semiconductor device to the memory is excluded.

Preferably, in the semiconductor device, the CPU makes uninterlock (or in other words, non-interlock) access to the memory, the request signal includes a chip select signal that can be used to request access to the memory from outside the semiconductor device, and the response signal includes a data complete signal that can be used to give notice that the access from outside to the memory has been completed. When the CPU is making a non-interlock access to the memory and the chip select signal is at a level which indicates that access to the memory from outside the semiconductor device is requested, the control circuit responds by causing the data complete signal to be at a response level which indicates that the access from the outside to the memory has been completed. When the CPU is making an interlock access to the memory, and the chip select signal is at a level which indicates that access to the memory from outside the semiconductor device is requested, the control circuit responds by causing the data complete signal to be at a different level from the response level to indicate that access to the memory from outside is excluded.

Preferably, in the semiconductor device, the CPU makes non-interlock access to the memory, the request signal includes a hold request signal that can be used to request a bus right and a chip select signal that can be used to request access to the memory from outside the semiconductor device, and the response signal comprises a hold acknowledge signal that can be used to give notice that the bus right has been freed and a data complete signal that can be used to give notice that the access to the memory from outside has been completed. The control circuit also has a first lock mode and a second lock mode which are switchable. In the first lock mode, at the time of an access by the CPU to the memory, the control circuit is responsive to the hold request signal. If the hold request signal is at a level which indicates that the bus right is requested and the access is a non-interlock access, the control circuit causes the hold acknowledge signal to be at a first response level which indicates that the bus right has been freed. If the hold request signal is at a level which indicates that the bus right is requested and the access is an interlock access, the control circuit causes the hold acknowledge signal to be at a different level from the first response level, to indicate that access to the memory from outside the semiconductor device is excluded.

In the second lock mode, at the time of an access by the CPU to the memory, the control circuit is responsive to the chip select signal. When the access is a non-interlock access and a level of the chip select signal indicates that access to the memory from outside the semiconductor device is requested, the control circuit causes the data complete signal to be at a second response level which indicates that access to the memory from outside has been completed. When the access is an interlock access and a level of the chip select signal indicates that access to the memory from outside the semiconductor device is requested, the control circuit causes the data complete signal to be at a level different from the second response level, that indicates that access to the memory from outside the semiconductor device is excluded.

A computer system according to the present invention comprises a semiconductor device comprising a CPU and a memory in one chip, the CPU making interlock access to the memory, an external bus master for making access to the memory, and an external bus controller which inhibits access to the memory by the external bus master in a period in which the CPU makes the interlock access.

As stated above, the present invention provides a semiconductor device with a built-in memory which can perform read-modify-write without being interfered with by access from outside.

Furthermore, the present invention provides a computer system with improved access contention.

An object of the present invention is to provide a semiconductor device with a built-in memory which includes a CPU and the memory on the same chip in which the problem of contention between access from outside of the chip to the memory and access from the CPU is improved.

Another object of the present invention is to obtain a semiconductor device with a built-in memory which includes a CPU and the memory on the same chip in which a series of memory accesses to the built-in memory from the CPU are performed in an undivided manner without being affected by accesses from outside.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6(a) to FIG. 6(f) are timing diagrams showing the instruction fetch access operation of the microprocessor of a preferred embodiment of the present invention.

FIG. 7(a) to FIG. 7(f) are timing diagrams showing the operand read access operation of the microprocessor of a preferred embodiment of the present invention.

FIG. 8(a) to FIG. 8(f) are timing diagrams showing the operand write access operation of the microprocessor of a preferred embodiment of the present invention.

FIG. 9(a) to FIG. 9(i) are timing diagrams showing the external bus master read access operation of the microprocessor of a preferred embodiment of the present invention.

FIG. 10(a) to FIG. 10(i) are timing diagrams showing the external bus master write cycle operation of the microprocessor of a preferred embodiment of the present invention.

FIG. 11(a) to FIG. 11(l) are timing diagrams showing operation in the case of access contention of the microprocessor of a preferred embodiment of the present invention.

FIG. 12(a) to FIG. 12(l) are timing diagrams showing operation in the case of access contention of the microprocessor of a preferred embodiment of the present invention.

FIG. 13(a) to FIG. 13(n) are timing diagrams showing the interlock access in the hold exclusive lock mode of the microprocessor of a preferred embodiment of the present invention.

FIG. 14(a) to FIG. 14(n) are timing diagrams showing the interlock access in the chip select exclusive lock mode of the microprocessor of a preferred embodiment of the present invention.

DESCRIPTION OF THE PREFERRED EMBODIMENT

First Preferred Embodiment

Figure 1:
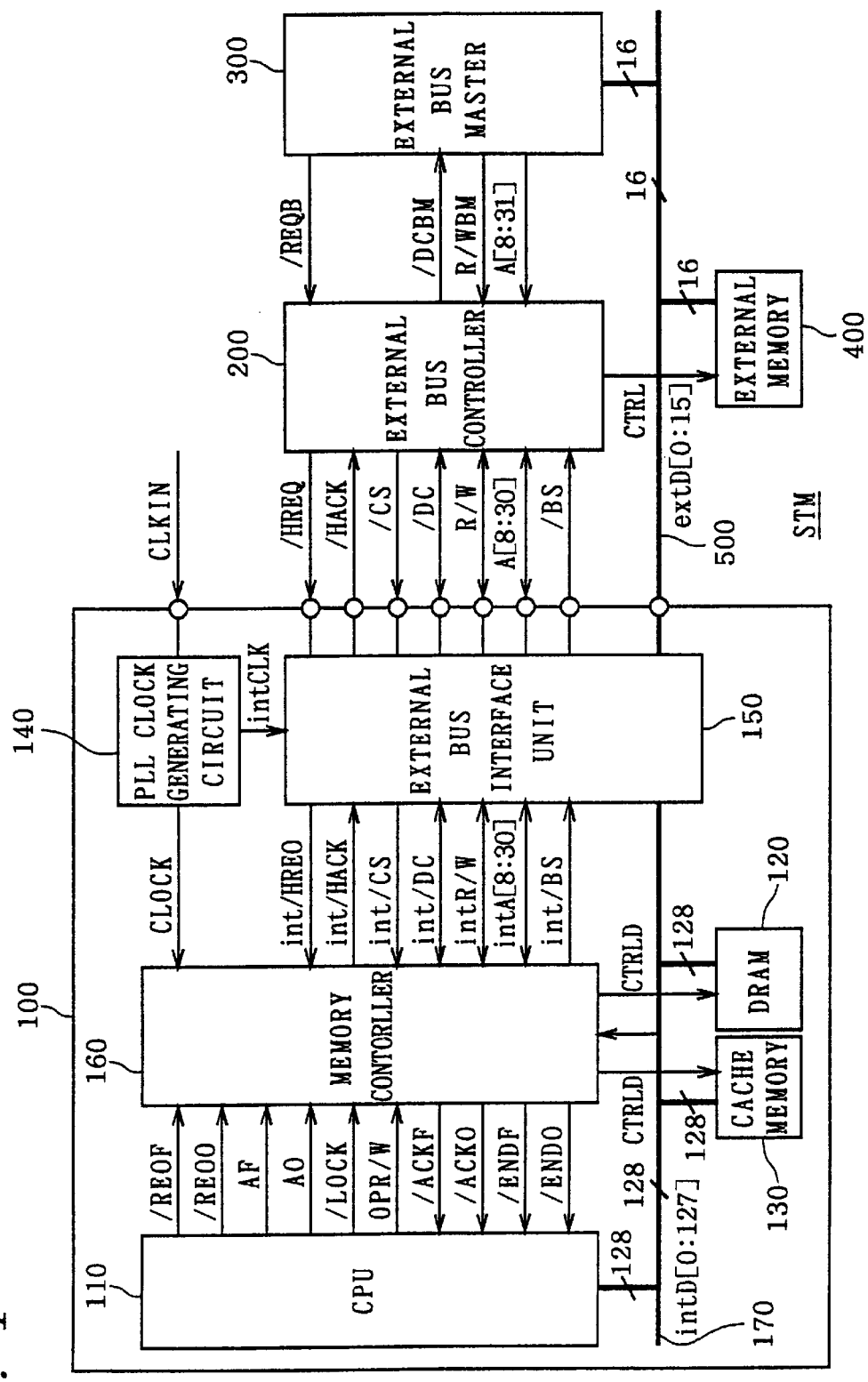
FIG. 1 is a block diagram showing a computer system according to a preferred embodiment of the present invention.

A 32-bit RISC (Reduced Instruction Set Computer) type microprocessor with built-in DRAM (Dynamic Random Access Memory) according to a preferred embodiment of the present invention will now be described referring to FIG. 1 to FIG. 14. First, referring to FIG. 1, a computer system STM has a one-chip microprocessor 100, an external bus controller 200, an external bus master 300, and an external memory 400, which are arranged on one board. The microprocessor 100, the external bus master 300 and the external memory 400 are connected to a 16-bit wide external data bus 500 formed on the board and exchange data through the external data bus 500.

The microprocessor 100, containing a DRAM 120 therein, receives a clock signal CLKIN inputted from outside to operate in synchronization with the clock signal CLKIN. The microprocessor 100 also receives a hold request signal /HREQ (request signal) from the external bus controller 200. When the hold request signal /HREQ goes to a low (L) level requesting the microprocessor 100 to make a transition to a hold state, it outputs a hold acknowledge signal /HACK (response signal) at a low (L) level indicating that it has entered a hold state.

That is to say, when the hold acknowledge signal /HACK is at a high (H) level indicating that the microprocessor 100 is not in the hold state, the bus right of using the external data bus 500 resides in the microprocessor 100. When the external bus master 300 needs the bus right of the external data bus 500 to read data from the external memory 400 through the external data bus 500, for example, the external bus controller 200 forces the hold request signal /HREQ to the low (L) level to request the bus right of the external data bus 500 from the microprocessor 100. When the microprocessor 100 determines to give the bus right of the external data bus 500, it makes a transition to the hold state by itself and frees the bus right of the external data bus 500, driving the hold acknowledge signal /HACK to the low (L) level to give notice that the bus right has been freed. Thus the external bus controller 200 controls the external data bus 500 so that data from the microprocessor 100, the external bus master 300 and the external memory 400 do not collide on the external data bus 500.

The microprocessor 100 also receives, from the external bus controller 200, a chip select signal /CS (request signal) for requesting access to the DRAM 120 contained in the microprocessor 100, a read/write signal R/W indicating whether the access is read or write, and a 23-bit address signal A[8:30] for specifying address in the built-in DRAM region to be accessed. In response to the chip select signal /CS at a low (L) level indicative of a request for access, when the read/write signal R/W is at a high (H) level indicative of read, the microprocessor 100 outputs data stored at the address specified by the address signal A[8:30] in the built-in DRAM region onto the external data bus 500 as external data extD[0:15]. When the read/write signal R/W is at a low (L) level indicative of write, it writes data corresponding to the external data extD[0:15] at the address specified by the address signal A[8:30] in the built-in DRAM region.

When access is made from the external bus master 300 to the built-in DRAM region, the microprocessor 100 also outputs a data complete signal /DC (response signal) for giving notice that access (internal bus cycle) to the built-in, DRAM region has been completed. When the chip select signal /CS is forced to the low (L) level, the microprocessor 100 outputs the data complete signal /DC at a high (H) level indicating that access to the built-in DRAM region is uncompleted. Then, when the access to the built-in DRAM region is completed, the microprocessor 100 changes the data complete signal /DC to the low (L) level indicative of completion of the access. When the chip select signal /CS returns to the high (H) level, then the microprocessor 100 terminates output of the data complete signal /DC. When the hold request signal /HREQ returns to the high (H) level, the microprocessor 100 places the hold acknowledge signal /HACK at the high (H) level.

The microprocessor 100 also outputs, to the external bus controller 200, a bus start signal /BS for starting a bus cycle to the external data bus 500. When making access to the external memory 400, the microprocessor 100 drives the bus start signal /BS to a low (L) level which indicates that a bus cycle has been started to the external data bus 500. At the same time, the microprocessor 100 provides the read/write signal R/W and the address signal A[8:30] to the external bus controller 200. When the read/write signal R/W is at the high (H) level, it reads data as external data extD[0:15] from the external memory 400 through the external data bus 500. When the read/write signal R/W is at the low (L) level, it outputs data as the external data extD[0:15] to the external data bus 500 and writes the data into the external memory 400. Subsequently, when the external bus controller 200 changes the data complete signal /DC to the low (L) level indicative of completion of access (external bus cycle) to the external memory 400, the microprocessor 100 brings the bus start signal /BS to the high (H) level. In response to the change of the data complete signal /DC to the low (L) level, the microprocessor 100 latches the read data or terminates hold of the write data.

The external bus controller 200 receives from the external bus master 300 a bus right request signal /REQB for giving notice of request for the bus right of the external data bus 500. When the bus right request signal /REQB goes to a low (L) level indicative of the request for the bus right, the external bus controller 200 drives the hold request signal /HREQ to the low (L) level and interrupts output of the data complete signal DC at the high (H) level. At this time, since the microprocessor 100 is not outputting the data complete signal /DC either, this data complete signal /DC comes in a high impedance state. When the bus right request signal /REQB attains the high (H) level, the external bus controller 200 places the hold request signal /HREQ at the high (H) level.

The external bus controller 200 also receives, from the external bus master 300, a bus master read/write signal R/WBM for indicating read or write of data and a 24-bit address signal A[8:31], and outputs the control signals /CS, R/W, A[8:30] for accessing the DRAM region in the microprocessor 100 and a control signal CTRL for accessing the external memory 400. When the hold acknowledge signal /HACK goes to the low (L) level in response to the hold request signal /HREQ, the external bus controller 200 changes the control signals /CS, R/W, A[8:30] or the control signal CTRL in response to the bus master read/write signal R/WBM and the address signal A[8:31].

More specifically, if the 4 bits A[8:11] in the 24-bit address signal A[8:31] from the external bus master 300 are 0000, the external bus controller 200 determines that the access is to the built-in DRAM region in the microprocessor 100. Then the external bus controller 200 forces the chip select signal /CS to the low (L) level and provides the 23 bits A[8:30] in the address signal A[8:31] to the microprocessor 100. If the bus master read/write signal R/WBM is at the high (H) level, it interprets it as read and drives the read/write signal R/W to the high (H) level. If the bus master read/write signal R/WBM is at the low (L) level, it interprets it as write and brings the read/write signal R/W to the low (L) level. If, in the 24-bit address signal A[8:31], at least one bit in the 4 bits A[8:11] is one, it interprets it as an access to the external memory 400. Then the external bus controller 200 causes the control signal CTRL to change according to the address signal A[8:31] and the bus master read/write signal R/WBM. The control signal CTRL generically represents a plurality of signals for controlling the external memory 400.

Furthermore, the external bus controller 200 outputs, to the external bus master 300, a bus master data complete signal /DCBM for giving notice of completion of access to the built-in DRAM region in the microprocessor 100 or to the external memory 400. When the external bus master 300 accesses the built-in DRAM region in the microprocessor 100 and the data complete signal /DC is placed at the low (L) level by the microprocessor 100, the external bus controller 200 brings the bus master data complete signal /DCBM to the low (L) level indicative of completion of the access. When the external bus master 300 accesses the external memory 400, the external bus controller 200 brings the bus master data complete signal /DCBM to the low (L) level, seeing when a predetermined read or write cycle time of the external memory 400 passes.

If the bus right request signal /REQB from the external bus master 300 is brought to the high (H) level when the chip select signal /CS is at the low (L) level, the external bus controller 200 brings the chip select signal /CS to the high (H) level before or at the same time as it causes the hold request signal /HREQ to change to the high (H) level and also terminates output of the read/write signal R/W and the address signal A[8:30].

When the bus start signal /BS goes to the low (L) level, the external bus controller 200 interprets it as access to the external memory 400 from the microprocessor 100. Then the external bus controller 200 causes the control signal CTRL to change according to the read/write signal R/W and the address signal A[8:30] from the microprocessor 100. Then, seeing when the predetermined read or write cycle time of the external memory 400 passes, the external bus controller 200 places the data complete signal /DC at the low (L) level and terminates hold of the control signal CTRL.

The external bus master 300 requests the bus right to the external data bus 500. For example, a microprocessor with the same configuration as the microprocessor 100 or another kind of microprocessor with different configuration is included in this external bus master 300. When accessing the built-in DRAM region in the microprocessor 100 or the external memory 400, the external bus master 300 drives the bus right request signal /REQB to the low (L) level and also changes the bus master read write signal R/WBM and the address signal A[8:31] to levels corresponding to the access. When the bus master data complete signal /DCBM goes to the low (L) level, the external bus master 300 latches the external data extD[0:15] in a read cycle, or terminates hold of the external data extD[0:15] in a write cycle.

The external memory 400 has a capacity of 16 MBytes (128 Mbits), including two 64-Mbit DRAMs which include 8 devices respectively, for example. The external memory 400 receives the control signal CTRL from the external bus controller 200, in response to which it stores the external data extD[0:15] provided through the external data bus 500, or outputs stored data onto the external data bus 500 as external data extD[0:15].

Next, the structure of the microprocessor 100 will be described. Referring to FIG. 1, the microprocessor 100 includes, on one chip, a CPU 110 for processing data, a 1-MByte (1 Megabyte) (i.e., 8-Megabits) built-in DRAM (Dynamic Random Access Memory) 120 for storing data, and a 4-KByte (4-Kilobyte) (i.e., 32-Kilobit) cache memory 130 for storing part of the data stored in the built-in DRAM 120. The microprocessor 100 also includes a PLL (phase Locked Loop) clock generating circuit 140 receiving the clock signal CLKIN inputted from outside to generate a clock signal CLOCK with a frequency four times that of the clock signal CLKIN and an internal clock signal intCLK synchronized with the clock signal CLKIN. The microprocessor 100 also includes an external bus interface unit 150 for exchanging signals between the outside of the chip and the internal circuits. The microprocessor 100 also includes a memory controller 160 which operates in synchronization with the clock signal CLOCK to receive various signals from the CPU 110 and the external bus interface unit 150 and control the DRAM 120 and the cache memory 130 in response to the signals. The microprocessor 100 also includes a 128-bit wide internal data bus 170, through which the CPU 110, the DRAM 120, the cache memory 130 and the external bus interface unit 150 exchange data.

The CPU 110 outputs, to the memory controller 160, an instruction fetch access request signal /REQF for giving notice of request of fetching instruction codes into the CPU 110, an operand access request signal /REQO for giving notice of request of reading or writing operand, the object data of execution of the instruction, an instruction fetch access address signal AF for specifying address of memory of the instruction fetch access, an operand access address signal AO for specifying address of memory for the operand access, and a lock signal /LOCK for giving notice as to whether the access to the built-in DRAM region requested by the CPU 110 is interlock access. Since the cache memory 130 stores a copy of part of the data in the DRAM 120, access to the built-in DRAM region means access to the DRAM 120 or to the cache memory 130. The CPU 110 also outputs an operand read/write signal OPR/W for indicating whether the operand access is read or write.

The CPU 110 receives, from the memory controller 160, an instruction fetch access acknowledge signal /ACKF (interlock access instruction) for acknowledging the acceptance of the instruction fetch access, an operand access acknowledge signal /ACKO (interlock access instruction) for acknowledging the acceptance of the operand access, an instruction fetch access end signal /ENDF (interlock access terminate instruction) for notifying completion of the instruction fetch access, and an operand access end signal /ENDO (interlock access terminate instruction) for notifying end of the operand access.

In the case of the instruction fetch access, the CPU 110 drives the instruction fetch access request signal /REQF to a low (L) level indicative of a request for the instruction fetch access and also changes the instruction fetch access address signal AF according to the address to be accessed. When the instruction fetch access acknowledge signal /ACKF changes to the low (L) level in response to the instruction fetch access request signal /REQF and then the instruction fetch access end signal /ENDF changes to the low (L) level indicative of end of the instruction fetch access, the CPU 110 latches 128-bit internal data intD [0:127] on the internal data bus 170.

In the case of the operand access, the CPU 110 drives the operand access request signal /REQO to a low (L) level indicative of request for the operand access. At the same time, the CPU 110 brings the operand read/write signal OPR/W to a high (H) level in the case of operand read and brings it to a low (L) level in the case of operand write, and changes the operand access address signal AO according to the address to be accessed. When the operand read is an interlock access, it also forces the lock signal /LOCK to the low (L) level indicative of interlock access. Then when the operand access acknowledge signal /ACKO changes to the low (L) level, it outputs, in the case of the operand write, the operand onto the internal data bus 170 as 32-bit data in the internal data intD[0:127]. If the operand write is an interlock access, it forces the lock signal /LOCK to the high (H) level to terminate the interlock access period. Then when the operand access end signal /ENDO changes to the low (L) level indicative of end of the operand access, the CPU 110 latches the 128-bit internal data intD[0:127] on the internal data bus 170 in the case of the operand read. In the case of the operand write, the CPU 110 terminates hold of the operand which has been outputted to the internal data bus 170.

The DRAM 120 receives a control signal CTRLD from the memory controller 160, and in response to which it stores the internal data intD[0:127] provided through the internal data bus 170, or outputs stored data onto the internal data bus 170 as the internal data intD[0:127]. The control signal CTRLD generically represents various signals for causing the DRAM 120 to perform read or write operation.

The cache memory 130 includes an SRAM (Static Random Access Memory.) The cache memory 130 receives a control signal CTRLC from the memory controller 160, in response to which it stores the internal data intD [0:127] provided through the internal data bus 170, or outputs stored data onto the internal data bus 170 as the internal data intD[0:127]. The control signal CTRLC generically represents various signals for causing the cache memory 130 to perform read or write operation. The cache memory 130 can copy and store part of data stored in the built-in DRAM 120 or part of data stored in the external memory 400. That is to say, it can be switched between a cache of the built-in DRAM 120 and a cache of the external memory 400. It is described as a cache of the built-in DRAM 120 herein.

The PLL clock generating circuit 140 includes a frequency multiplier, which outputs the 66.6 MHz clock signal CLOCK when the clock signal CLKIN inputted from outside has a frequency of 16.65 MHz, for example. The internal clock signal intCLK is in phase with the input clock signal CLKIN and has the same frequency as the clock signal CLKIN.

The external bus interface unit 150 externally receives the hold request signal /HREQ, the chip select signal /CS, the data complete signal /DC, the read write signal R/W and the address signal A[8:30], to output, correspondingly, the internal hold request signal int/HREQ, the internal chip select signal int/CS, the internal data complete signal int/DC, the internal read write signal intR/W and the internal address signal intA[8:30]. The external bus interface unit 150 receives the internal hold acknowledge signal int/HACK, the internal data complete signal int/DC, the internal read/write signal intR/W, and the internal bus start signal int/BS, to output, respectively and correspondingly, the hold acknowledge signal /HACK, the data complete signal /DC, the read/write signal R/W, and the bus start signal /BS to outside.

The external bus interface unit 150 also transfers data between the external data bus 500 and the internal data bus 170. When transferring data from the internal data bus 170 to the external data bus 500, the external bus interface unit 150 holds the 128-bit parallel internal data intD[0:127] on the internal data bus 170 and serially outputs the data, 16 bits at a time, onto the external data bus 500 as the external data extD[0:15]. On the other hand, when transferring data from the external data bus 500 to the internal data bus 170, the external interface unit 150 first serially capture and holds the external data extD [0:15] on the external data bus 500, 16 bits at a time, and outputs the data onto the internal data bus 170 in parallel. As to the parallel output, it may capture up to 128 bits and output the 128 bits in parallel, or may capture only 32 bits and output the 32 bits in parallel, or similarly, it may be 64-bit output or 96-bit output.

The memory controller 160 receives, from the CPU 110, the instruction fetch access address signal AF, the operand access address signal AO, the instruction fetch access request signal /REQF, the operand access request signal /REQO, the lock signal /LOCK and the operand read/write signal OPR/W, and from the external bus interface unit 150, the internal hold request signal int/HREQ and the internal chip select signal int/CS. The internal hold request signal int/HREQ and the internal chip select signal int/CS are necessary to access the built-in DRAM region from outside. The memory controller 160 arbitrates the four requests: the instruction fetch access request, the operand access request, the hold request and the chip select (access request to the built-in DRAM region.)

The memory controller 160 performs arbitration in different manners in the interlock access period and the non-interlock or "uninterlock" access period. The interlock access includes two kinds of modes which are switchable in software, the hold exclusive lock mode (first lock mode) performed exclusively of the internal hold request signal int /HREQ and the chip select exclusive lock mode (second lock mode) performed exclusively of the internal chip select signal int /CS. The way of arbitration is also switched in each mode. The memory controller 160 outputs the instruction fetch access acknowledge signal /ACKF, the operand access acknowledge signal /ACKO, the internal hold acknowledge signal int/HACK and the internal data complete signal int/DC which reflect the results of the arbitration of the four requests.

In the non-interlock or "uninterlock" access, when the internal hold request signal int/HREQ goes to the low (L) level, the memory controller 160 checks to see if the microprocessor 100 is attempting to start a bus cycle to the external data bus 500. If it is not, it brings the internal hold acknowledge signal int/HACK to the low (L) level. That is to say, it determines whether an instruction fetch access or an operand access is going to be made to the external memory 400 according to whether the instruction fetch access request signal /REQF or the operand access request signal /REQO, for indicating request of the instruction fetch access or the operand access, is at the low (L) level, and according to whether the instruction fetch access address signal AF or the operand access address signal AO specifies an address of the external memory 400.

When the instruction fetch access request signal /REQF is at the low (L) level and the instruction fetch access address signal AF specifies an address in the external memory 400, or when the operand access request signal /REQO is at the low (L) level and the operand access address signal AO specifies an address in the external memory 400, the memory controller 160 does not bring the internal hold access acknowledge signal int/HACK to the low (L) level, even when the internal hold request signal int/HREQ comes to the low (L) level, until the instruction fetch access or the operand access from outside the semiconductor device that is being executed, terminates. Otherwise, it soon brings the internal hold acknowledge signal in/HACK to the low (L) level.

In the non-interlock or "uninterlock" access, if the internal hold request signal int/HREQ is at the low (L) level, the memory controller 160 does not accept the request from the CPU 110 for the instruction fetch access or the operand access to the outside. That is to say, when the internal hold request signal int/HREQ is at the low (L) level, even if the instruction fetch access address signal AF specifies an address in the external memory 400 and the instruction fetch access request signal /REQF is at the low (L) level, or the operand access address signal AO specifies an address in the external memory 400 and the operand access request signal REQO is at the low (L) level, the memory controller 160 does not cause the instruction fetch access acknowledge signal /ACKF or the operand access acknowledge signal /ACKO corresponding to the request to go to the low (L) level until the internal hold request signal int/HREQ goes to the high (H) level and it brings the internal hold acknowledge signal int/HACK to the high (H) level to obtain the bus right of the external data bus 500.

That is to say, when non-interlocked, if the instruction fetch access and the operand access are accesses to the external memory 400, the memory controller 160 brings the responding signals, the instruction fetch access acknowledge signal /ACKF, the operand access acknowledge signal /ACKO and the internal hold acknowledge signal int/HACK to the low (L) level in the order in which the instruction fetch access request signal /REQF, the operand access request signal /REQO, and the internal hold request signal int/ HREQ attain the low (L) level. When the instruction fetch access request signal /REQF, the operand access request signal /REQO and the internal hold request signal int/HREQ attain the low (L) level at the same time, the memory controller 160 first responds to the hold request and causes the internal hold acknowledge signal int/HACK to go to the low (L) level. It then responds to the operand access request and causes the operand access acknowledge signal /ACKO to go to the low (L) level. When this operand access is ended, it responds to the instruction fetch access request and causes the instruction fetch access acknowledge signal /ACKF to go to the low (L) level.

However, if the instruction fetch access and the operand access are accesses to the built-in DRAM region at the time of non-interlock or "uninterlock", it brings the responding signals, the instruction fetch access acknowledge signal /ACKF and the operand access acknowledge signal /ACKO to the low (L) level in the order in which the instruction fetch access request signal /REQF and the operand access request signal /REQO have attained the low (L) level, irrespective of the internal hold request signal int/HREQ. In this case, if the instruction fetch access request signal /REQF and the operand access request signal /REQO go to the low (L) level at the same time, it first brings the operand access acknowledge signal /ACKO to the low (L) level, and when this operand access ends, it responds to the instruction fetch access request by bringing the instruction fetch access acknowledge signal /ACKF to the low (L) level.

In the non-interlock or "uninterlock" access, when the internal chip select signal int/CS goes to the low (L) level, if the instruction fetch access request signal /REQF and the operand access request signal /REQO are at the high (H) level, or, if at least one of them is already at the low (L) level but the request is an access to outside and therefore the corresponding instruction fetch access acknowledge signal /ACKF or operand access acknowledge signal /ACKO is maintained at the high (H) level, the memory controller 160 makes access to the built-in DRAM region in response to the chip select. When this access ends, it brings the responding internal data complete signal int/DC to the low (L) level.

When the instruction fetch access request signal /REQF, the operand access request signal /REQO and the internal chip select signal int/CS attain the low (L) level at the same time in the non-interlock or "uninterlock" access, the memory controller 160 first makes access to the built-in DRAM region in response to the chip select, and when this access is ended, it brings the internal data complete signal int/DC to the low (L) level. Then it responds to the operand access request by bringing the operand access acknowledge signal /ACKO to the low (L) level. On completion of this operand access, it responds to the instruction fetch access request by placing the instruction fetch access acknowledge signal /ACKF at the low (L) level. Since the chip select signal /CS is placed at the low (L) level after the hold request signal /HREQ and the hold acknowledge signal /HACK are placed at the low (L) level, the internal hold acknowledge signal int/HACK is at the low (L) level when the internal chip select signal int/CS goes to the low (L) level.

When the lock signal /LOCK is brought to the low (L) level, the operand read/write signal OPR/W to the high (H) level and the operand access request signal /REQO to the low (L) level, and in response, the operand access acknowledge signal /ACKO is driven to the low (L) level, that is, when the interlocked operand read cycle starts, the interlock access period starts. This interlock access period ends when the lock signal /LOCK is brought to the high (H) level, the operand read/write signal OPR/W to the low (L) level and the operand access request signal /REQO to the low (L) level, and then the operand access end signal /ENDO to the low (L) level, that is, when the interlocked operand write cycle ends.

In the interlock access period, if it is set to the hold exclusive lock mode, the memory controller 160 causes the internal hold acknowledge signal int/HACK to be at the high (H) level indicating that access to the built-in DRAM region from outside is excluded, while ignoring the internal hold request signal int/HREQ, even if it goes to the low (L) level, until the interlock access period ends. In the interlock period, the memory controller 160 brings the responding signals, the instruction fetch access acknowledge signal /ACKF and the operand access acknowledge signal /ACKO to the low (L) level in the order in which the instruction fetch access request signal /REQF and the operand access request signal /RBQO attain the low (L) level. When the instruction fetch access request signal /REQF and the operand access request signal /REQO go to the low (L) level at the same time, the memory controller 160 brings the operand access acknowledge signal /ACKO to the low (L) level, first. When this operand access is ended, it brings the instruction fetch access acknowledge signal /ACKF to the low (L) level.

In the interlock access period, if it is set to the chip select exclusive lock mode, the memory controller 160 maintains the data complete signal int/DC at the high (H) level, without making access to the built-in DRAM region, to indicate that access to the built-in DRAM region is excluded, while ignoring the internal chip select signal int/CS, even if it attains the low (L) level, until the interlock access period terminates. At this time, the memory controller 160 brings the responding signals, the instruction fetch access acknowledge signal /ACKF and the operand access acknowledge signal /ACKO to the low (L) level in the order in which the corresponding instruction fetch access request signal /REQF and operand access request signal /REQO attain the low (L) level. If the instruction fetch access request signal /REQF and the operand access request signal /REQO attain the low (L) level at the same time, the memory controller 160 first brings the operand access acknowledge signal /ACKO to the low (L) level. Then when this operand access is terminated, it brings the instruction fetch access acknowledge signal /ACKF to the low (L) level.

Furthermore, the memory controller 160 receives, from the external bus interface unit 150, the internal data complete signal int/DC, the internal read/write signal intR/W, and the internal address signal intA[8:30], and outputs the instruction fetch access end signal /ENDF, the operand access end signal /ENDO, the internal read/write signal intR/W, the internal address signal intA[8:30], the internal bus start signal int/BS, the control signal CTRLD and the control signal CTRLC.

When having caused the instruction fetch access acknowledge signal /ACKF to go to the low (L) level, the memory controller 160 checks to see if the instruction fetch access address signal AF from the CPU 110 specifies an address in the built-in DRAM region or specifies an address in the external memory 400. As the result, when it determines that it is access to the external memory 400, it brings the internal read/write signal intR/W to the high (H) level indicative of read, changes the internal address signal intA[8:30] to an address for accessing the external memory 400, and brings the internal bus start signal int/BS to the low (L) level indicating that a bus cycle has been started to the external data bus 500. Then, when the internal data complete signal int/DC goes to the low (L) level indicative of completion of the bus cycle, the memory controller 160 returns the internal bus start signal int/BS to the high (H) level and brings it to the low (L) level again and also changes the internal address signal intA[8:30] to start the bus cycle. This way, it starts the bus cycle twice when capturing 32-bit data, four times with 64 bits, six times with 96 bits and eight times with 128 bits. Then the memory controller 160, in response to the internal data complete signal int/DC attaining the low (L) level twice, four time, six times, or eight times, causes the instruction fetch access end signal /ENDF to go to the low (L) level.

If it determines that the access is to the built-in DRAM region as the result of the check, the memory controller 160 checks to see if the instruction fetch access address signal AF from the CPU 110 is address corresponding to data stored in the cache memory 130. If it is a corresponding address, it interprets it as a cache hit, as access to the cache memory 130, and changes the control signal CTRLC for controlling the cache memory 130. If it is not a corresponding address, it interprets it as access to the built-in DRAM 120, as a cache miss, and then changes the control signal CTRLD for controlling the built-in DRAM 120. Then the memory controller 160, seeing when the cycle time of the built-in DRAM 120 or the cache memory 130 passes, brings the instruction fetch access end signal /ENDF to the low (L) level and ends hold of the control signal CTRLC or CTRLD.

Similarly to the case in which it brought the instruction fetch access acknowledge signal /ACKF to the low (L) level, when the memory controller 160 has brought the operand access acknowledge signal /ACKO to the low (L) level, if it determines that the operand access is an access to the external memory 400, it responds to the operand read/write signal OPR/W by setting the internal read/write signal intR/W to the high (H) level if the operand read/write signal OPR/W is at the high (H) level, and to the low (L) level if it is at the low (L) level. At the same time, it changes the internal address signal intA[8:30] to an address for accessing the external memory 400 and brings the internal bus start signal int/BS to the low (L) level indicating that a bus cycle has been started to the external data bus 500.

Subsequently, when the internal data complete signal int/DC goes to the low (L) level indicating completion of the bus cycle, the memory controller 160 returns the internal bus start signal int/BS to the high (H) level and brings it to the low (L) level again, and also changes the internal address signal intA[8:30] to start a bus cycle. This way, it starts the bus cycle twice when capturing or outputting 32-bit data, four times with 64 bits, six times with 96 bits and eight times with 128 bits. Then the memory controller 160, in response to the internal data complete signal int/DC attaining the low (L) level twice, four time, six times, or eight times, brings the operand access end signal /ENDO to the low (L) level.

When it interprets the operand access as an access to the built-in DRAM region, it changes the control signal CTRLC for controlling the cache memory 130, if it is a cache hit, in response to the operand access address signal AO and the operand read/write signal OPR/W from the CPU 110. If it is a cache miss, it changes the control signal CTRLD for controlling the built-in DRAM 120 in response to the operand access address signal AO and the operand read/write signal OPR/W from the CPU 110. Then, seeing when the cycle time of the built-in DRAM 120 or the cache memory 130 passes, the memory controller 160 brings the operand access end signal /ENDO to the low (L) level and terminates hold of the control signal CTRLC or CTRLD.

Furthermore, when responding to the internal chip select signal int/CS attaining the low (L) level, the memory controller 160 determines whether it is a cache hit or miss on the basis of the internal address intA[8:30] from the external bus interface unit 150, similarly to the access to the built-in DRAM region by the CPU 110. Then if it is a cache hit, it causes the control signal CTRLC for controlling the cache memory 130 to change in response to the internal read write signal intR/W and the internal address intA[8:30] from the external bus interface unit 150. If it is a cache miss, it causes the control signal CTRLD for controlling the built-in DRAM 120 to change in response to the internal read write signal intR/W and the internal address intA[8:30] from the external bus interface unit 150. Subsequently, seeing when the cycle time of the built-in DRAM 120 or the cache memory 130 passes, the memory controller 160 brings the internal data complete signal int/DC to the low (L) level and terminates hold of the control signal CTRLC or CTRLD.

Figure 2:
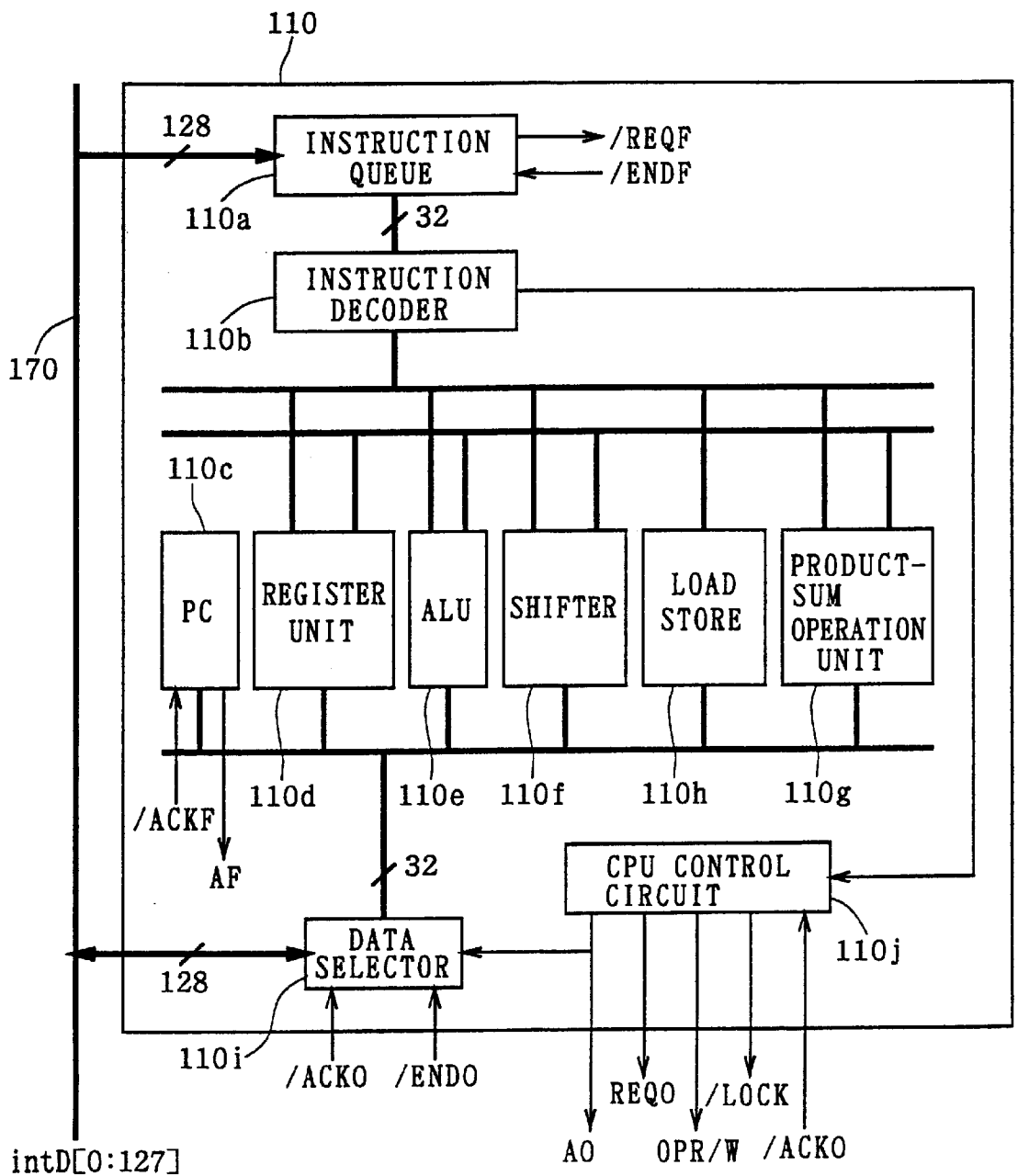
FIG. 2 is a block diagram showing the CPU of a preferred embodiment of the present invention.

Next, referring to FIG. 2, the CPU 110 will be described in some more detail. The CPU 110 is composed of a 32-bit RISC type CPU core. Its instruction length is 16 bits or 32 bits. The operand access from the CPU 110 to the built-in DRAM region or to the external memory 400 is made only with load instruction and store instruction. Referring to FIG. 2, the CPU 110 includes an instruction queue 110*a* which receives 128-bit internal data intD[0:127] from the internal data bus 170 to output 32 bits therefrom as instruction data. The CPU 110 also includes an instruction decoder 110*b* for decoding and outputting instruction received from the instruction queue 110*a*. When 32-bit data is transferred from the instruction queue 110*a*, it is not known if the data is a 32-bit instruction or a 16-bit instruction. Then this instruction decoder 110*b* decodes it to show if it is 32 bits or 16 bits.

The CPU 110 also includes a program counter 110*c* generating an instruction fetch access address signal AF for specifying address storing instructions to be fetched by the instruction queue 110*a* and a register unit 110*d* for storing data. The register unit 110*d* has 16 32-bit wide registers. Furthermore, the CPU 110 includes an ALU (Arithmetic Logic Unit) 110*e* for performing logic operations of data, such as addition, subtraction, AND, and OR, a shifter 110*f* for shifting or rotating bit string of data for a desired number of bits, and a product-sum operation unit 110*g* for performing product-sum operation of data. The product-sum operation unit 110*g* includes a 32×16 bit multiplier and a 56-bit accumulator. The CPU 110 also includes a load store unit 110*h* for loading and storing data among the register unit 110*d*, the ALU 110*e*, the shifter 110*f* and the product-sum operation unit 110*g*.

The CPU 110 also includes a data selector 110*i* which receives the 128-bit internal data intD[0:127] from the internal data bus 170 and outputs 32 bits therefrom, and receives 32-bit data from units such as the register 110*d* and outputs the data onto the internal data bus 170. The CPU 110 also includes a CPU control circuit 110*j* for controlling the operand access. The instruction is processed in the fivestage pipeline. The pipeline includes the instruction fetch in the instruction queue 110*a*, the instruction decode in the instruction decoder 110*b*, the execution in the ALU 110*e* and the like, the memory access in the CPU control circuit 110*j*, and the write back to registers in the data selector 110*i*.

The instruction queue 110*a*, when having outputted all necessary instructions to the instruction decoder 110*b*, causes the instruction fetch access request signal /REQF to be at the low (L) level to fetch the next instruction. Then, when instruction is transmitted through the internal data bus 170 and the instruction fetch access end signal /ENDF attains the low (L) level, it latches the instruction from the internal data bus 170. The instruction decoder 110*b* decodes the instruction provided from the instruction queue 110*a* and transfers it to the register unit 110*d*, the ALU 110*e*, the shifter 110*f*, the product-sum operation unit 110*g*, the load store unit 110*h*, or the CPU control circuit 110*j*. When the instruction queue 110a places the instruction fetch access request signal /REQF at the low (L) level, the program counter 110c causes the instruction fetch access address signal AF for specifying the destination of the instruction fetch access to change to the address to be accessed. When the instruction fetch acknowledge signal /ACKF attains the low (L) level, the program counter 110c terminates output of the instruction fetch access address signal AF.

The data selector 110i receives the operand access address signal AO, the operand access acknowledge signal /ACKO and the operand access end signal /ENDO. At the time of the operand write, when the operand access acknowledge signal /ACKO attains the low (L) level, the data selector 110i outputs 32-bit data received from the register unit 110d or the like to the 32 bits responding to the operand access address signal AO in the 128-bit wide internal data bus 170. At the time of the operand read, when the operand access end signal /ENDO attains the low (L) level, the data selector 110i latches the 128-bit data from the internal data bus 170 and outputs 32 bits therefrom corresponding to the operand access address signal AO.

The CPU control circuit 110j receives decoded instruction from the instruction decoder 110b. When the instruction from the instruction decoder 110b is a load instruction or a store instruction and the operand specifying portion of the instruction specifies the built-in DRAM region, the external memory 400, or a register in the microprocessor 100 but out of the CPU 110, the CPU control circuit 110j changes the operand access address signal AO corresponding to the operand specifying portion. At this time, the CPU control circuit 110j brings the operand access request signal /REQO to the low (L) level and brings the operand read/write signal OPR/W to the high (H) level in the case of the load instruction, or to the low (L) level in the case of the store instruction. When the load instruction is a load instruction with interlock, the CPU control circuit 110j brings the lock signal /LOCK to the low (L) level, and when it is a store instruction with interlock, it returns the lock signal /LOCK to the high (H) level.

Figure 3:
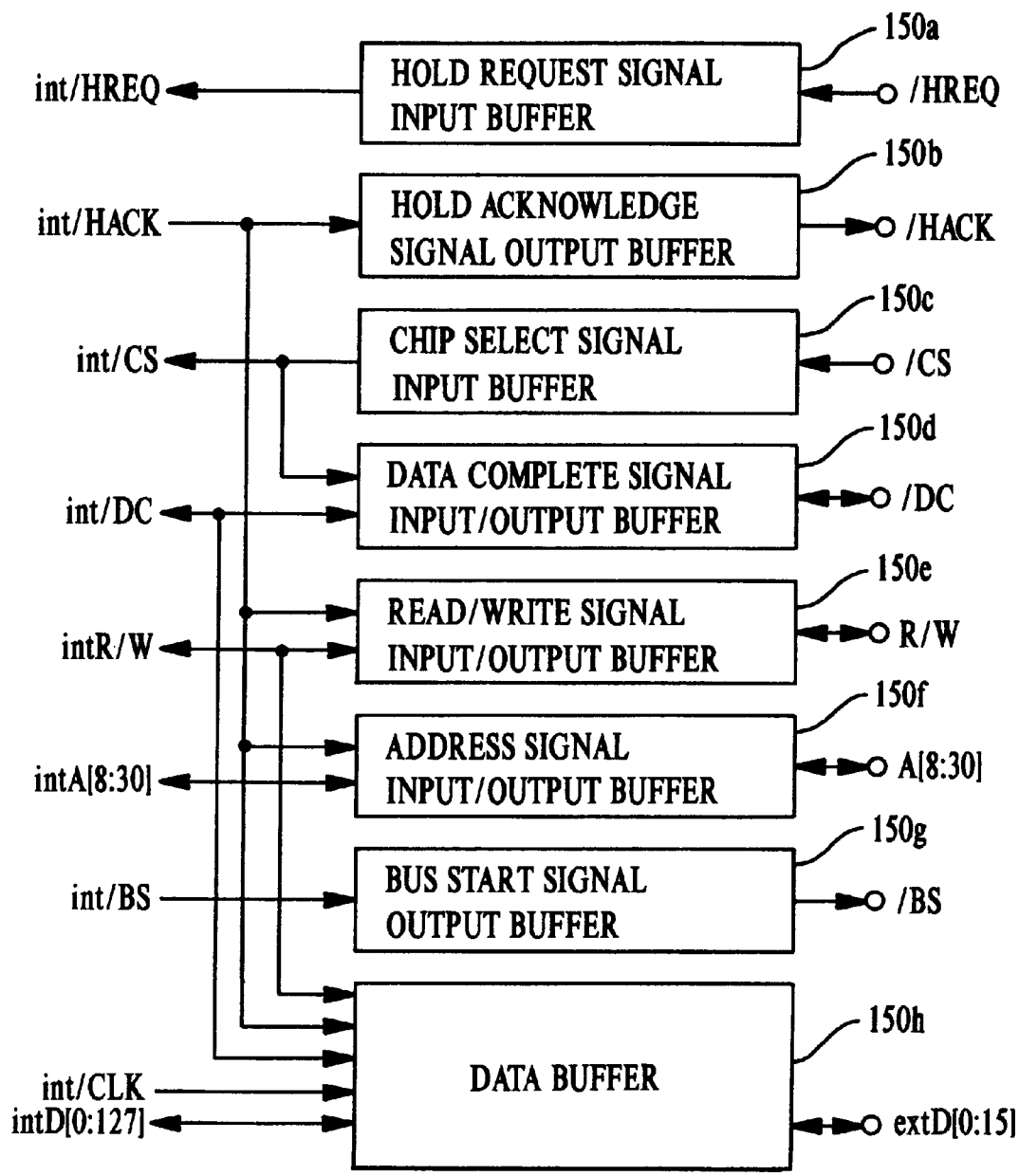
FIG. 3 is a block diagram showing the external bus interface unit of a preferred embodiment of the present invention.

Next, the external bus interface unit 150 will be described in some more detail. Referring to FIG. 3, the external bus interface unit 150 includes a hold request signal input buffer 150a which receives the hold request signal /HREQ from outside to output the internal hold request signal int/HREQ. The hold request signal input buffer 150a causes the internal hold request signal int/HREQ to be at the high (H) level if the hold request signal /HREQ is at the high (H) level, and to be at the low (L) level if it is at the low (L) level. The external bus interface unit 150 also includes a hold acknowledge signal output buffer 150b receiving the internal hold acknowledge signal int/HACK to output the hold acknowledge signal /HACK to outside. The hold acknowledge signal output buffer 150b causes the hold acknowledge signal /HACK to be at the high (H) level if the internal hold acknowledge signal int/HACK is at the high (H) level, and to be at the low (L) level if it is at the low (L) level.

The external bus interface unit 150 further includes a chip select signal input buffer 150c receiving the chip select signal /CS from outside to output the internal chip select signal int/CS. The chip select signal input buffer 150c brings the internal chip select signal int/CS to the high (H) level if the chip select signal /CS is at the high (H) level, and to the low (L) level if it is at the low (L) level. The external bus interface unit 150 further includes a data complete signal input/output buffer 150d which receives the internal chip select signal int/CS, also receives the data complete signal /DC from outside to output the internal data complete signal int/DC, and further receives the internal data complete signal int/DC to output the data complete signal /DC. When the internal chip select signal int/CS is at the high (H) level, the data complete signal input/output buffer 150d brings the internal data complete signal int/DC to the high (H) level if the data complete signal /DC from outside is at the high (H) level and to the low (L) level if it is at the low (L) level. When the internal chip select signal int/CS is at the low (L) level, it causes the data complete signal /DC to outside to be at the high (H) level if the internal data complete signal int/DC is at the high (H) level and to go to the low (L) level if it is at the low (L) level.

The external bus interface unit 150 further includes a read/write signal input/output buffer 150e which receives the internal hold acknowledge signal int/HACK, also receives the read/write signal R/W from outside to output the internal read/write signal intR/W, and also receives the internal read/write signal intR/W to output the read/write signal R/W. When the internal hold acknowledge signal int/HACK is at the high (H) level, the read/write signal input/output buffer 150e causes the read/write signal R/W to be at the high (H) level if the internal read/write signal intR/W is at the high (H) level, and to be at the low (L) level if it is at the low (L) level. When the internal hold acknowledge signal int/HACK is at the low (L) level, it causes the internal read/write signal intR/W to be at the high (H) level if the read/write signal R/W from outside is at the high (H) level, and to be at the low (L) level if it is at the low (L) level.

Furthermore, the external bus interface unit 150 includes an address signal input/output buffer 150f which receives the internal hold acknowledge signal int/HACK, also receives the address signal A[8:30] from outside to output the internal address signal intA[8:30], and also receives the internal address signal intA[8:30] to output the address signal A[8:30]. When the internal hold acknowledge signal int/HACK is at the high (H) level, the address signal input/output buffer 150f causes the address signal A[8:30] to be at the same level as the internal address signal intA[8:30]. When the internal hold acknowledge signal int/HACK is at the low (L) level, it causes the internal address signal intA[8:30] to be at the same level as the address signal A[8:30].

Moreover, the external bus interface unit 150 includes a bus start signal output buffer 150g which receives the internal bus start signal int/BS and outputs the bus start signal /BS to outside. The bus start signal output buffer 150g causes the bus start signal /BS to be at the high (H) level if the internal bus start signal int/BS is at the high (H) level and to be at the low (L) level if it is at the low (L) level.

The external bus interface unit 150 further includes a data buffer 150h which receives the internal hold acknowledge signal int/HACK, the internal data complete signal int/DC, the internal read/write signal intR/W and the internal clock signal intCLK, also receives the external data extD[0:15] from outside to output the internal data intD[0:127], and also receives the internal data intD[0:127] to output the external data extD[0:15], for bus width conversion between the 128-bit internal data bus and the 16-bit external data bus. When the internal hold acknowledge signal int/HACK is at the high (H) level, and the internal read/write signal intR/W is at the high (H) level, and the internal data complete signal int/DC is at the low (L) level when the internal clock signal intCLK changes from the low (L) level to the high (H) level, then the data buffer 150h latches the 16-bit external data extD[0:15] and stores the data in the data buffer 150h, and also outputs the stored data as any 16 bits in the 128-bit internal data intD[0:127].

When the internal hold acknowledge signal int/HACK is at the high (H) level, and the internal read/write signal intR/W is at the low (L) level, and the internal data complete signal int/DC is at the low (L) level when the internal clock signal intCLK changes from the low (L) level to the high (H) level, then the data buffer 150h ceases to hold or output latched data from the 128-bit internal data intD[0:127] on the 16-bit external data extD[0:15]. Furthermore, when the internal hold acknowledge signal int/HACK is at the low (L) level, and the internal read/write signal intR/W is at the high (H) level, and the internal data complete signal int/DC is at the low (L) level when the internal clock signal intCLK changes from the high (H) level to the low (L) level, then the data buffer 150h outputs the 16-bit external data extD[0:15] from the 128-bit internal data intD[0:127].

When the internal hold acknowledge signal int/HACK is at the low (L) level, and the internal read/write signal intR/W is at the low (L) level, and the internal data complete signal int/DC is at the low (L) level when the internal clock signal intCLK changes from the high (H) level to the low (L) level, then the data buffer 150h latches the 16 bit external data extD[0:15] and stores it in the data buffer 150h, and outputs the stored data as any 16 bits in the 128-bit internal data intD[0:127].

Figure 4:
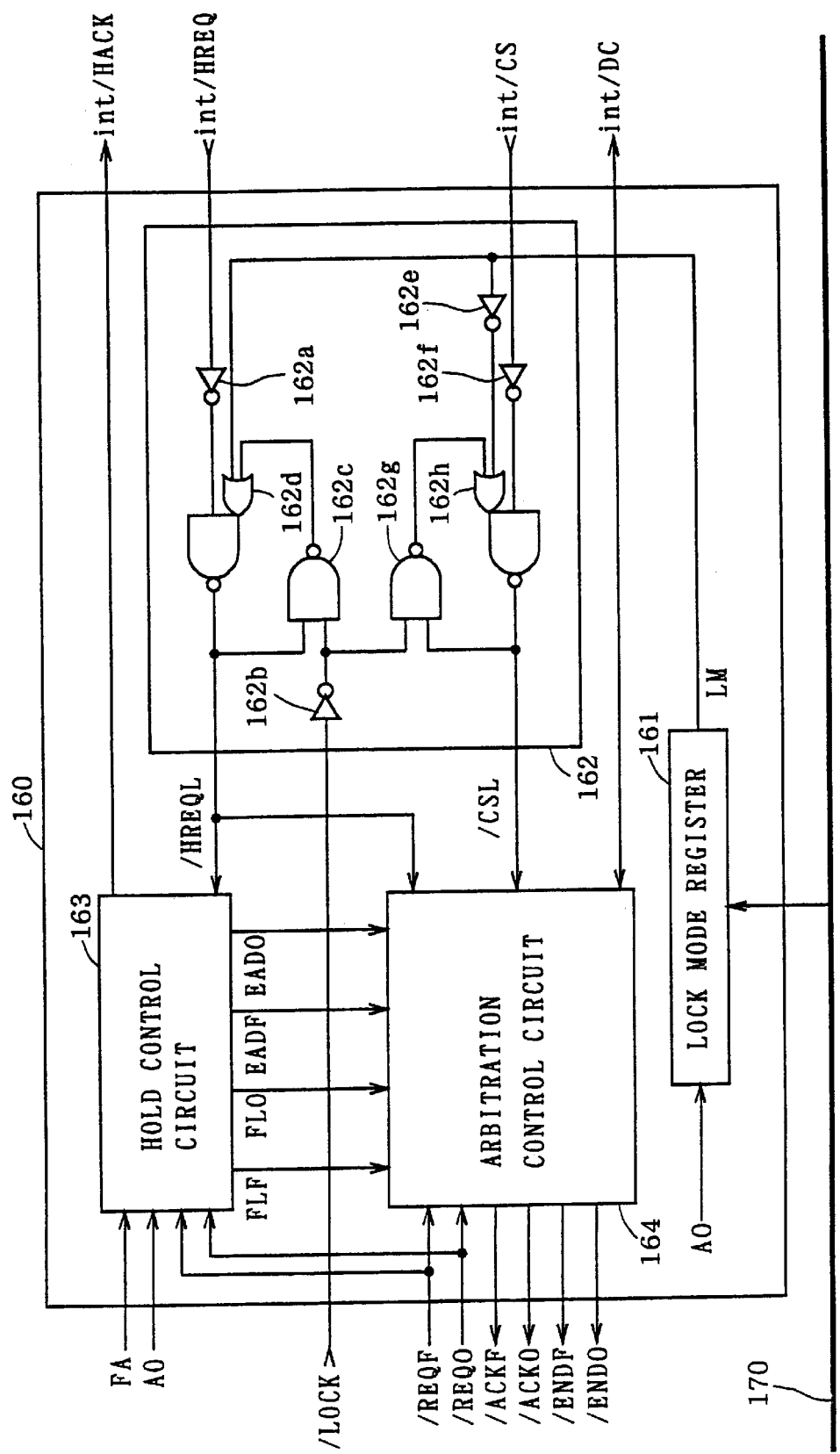
FIG. 4 is a block diagram showing the memory controller of a preferred embodiment of the present invention.

Next, the memory controller 160 in the microprocessor 100 will be further described in some more detail. Referring to FIG. 4, the memory controller 160 includes a lock mode register 161 which stores data transferred through the internal data bus and outputs the stored data as a lock mode signal LM, for setting the lock mode. When the lock mode signal LM is at the low (L) level, the lock mode is set to the hold exclusive lock mode, and when it is at the high (H) level, it is set to the chip select exclusive lock mode. The CPU 110 is caused to perform store instruction to the lock mode register 161 to set the value of the lock mode register 161. That is to say, it is caused to perform instructions of ST, AO, and LM, where ST represents a store instruction, AO represents a destination address where data is to be stored when the store instruction ST is executed, and LM represents data of the lock mode. When the operand access is made by setting the AO to an address in the lock mode register 161 and the LM to 0 when setting the hold exclusive lock mode, or to 1 when setting the chip select exclusive lock mode, then the lock mode register 161 is specified by the operand access address signal AO and the LM is transferred to the lock mode register 161 through the internal data bus 170.

The memory controller 160 also includes an interlock circuit 162 which receives the lock mode signal LM, the lock signal /LOCK, the internal hold request signal int/HREQ and the internal chip select signal int/CS and outputs a locked hold request signal /HREQL and a locked chip select signal /CSL. The interlock circuit 162 includes an inverter 162a which receives the internal hold request signal int/HREQ and outputs its inverse signal and an inverter 162b which receives the lock signal /LOCK to output its inverse signal. The interlock circuit 162 further includes a NAND circuit 162c receiving the inverse signal from the inverter 162b and the locked hold request signal /HREQL, and a composite gate circuit 162d including a NAND gate and an OR gate receiving the inverse signal from the inverter 162a, the output signal of the NAND circuit 162c and the lock mode signal LM to output the locked hold request signal /HREQL.

The interlock circuit 162 further includes an inverter 162e receiving the lock mode signal LM to output its inverse signal and an inverter 162f receiving the internal chip select signal int/CS to output its inverse signal. The interlock circuit 162 also includes a NAND circuit 162g receiving the inverse signal of the lock signal /LOCK from the inverter 162b and the locked chip select signal /CSL, and a composite gate circuit 162h composed of a NAND gate and an OR gate receiving the output signal of the NAND circuit 162g, the inverse signal from the inverter 162f and the inverse signal of the lock mode signal LM from the inverter 162e for outputting the locked chip select signal /CSL. When the lock signal /LOCK is at the high (H) level, the interlock circuit 162 causes the locked hold request signal /HREQL and the locked chip select signal /CSL to change to levels corresponding to the internal hold request signal in VHREQ and the internal chip select signal int/CS, irrespective of the value of the lock mode signal LM.

When the lock signal /LOCK is at the low (L) level and the locked hold request signal /HREQL is at the high (H) level, and the lock mode signal LM is at the low (L) level, the interlock circuit 162 then locks the locked hold request signal/HREQL to the high (H) level, irrespective of the internal hold request signal int/HREQ. When the lock signal /LOCK is at the low (L) level and the locked chip select signal /CSL is at the high (H) level, and the lock mode signal LM is at the high (H) level, the interlock circuit 162 then changes the locked hold request signal /HREQL to a level corresponding to the internal hold request signal int/HREQ, but it locks the locked chip select signal /CSL at the high (H) level irrespective of the internal chip select signal int/CS.

In the description of the memory controller 160 given above, the case in which the instruction fetch access request signal /REQF, the operand access request signal /REQO and the internal hold request signal int/HREQ attain the low (L) level at the same time was described for convenience. However, strictly, due to delays in the inverter 162a and the composite gate circuit 162d in the interlock circuit 162, the description corresponds to the case in which the instruction fetch access request signal /REQF, the operand access request signal /REQO and the locked hold request signal /HREQL attain the low (L) level at the same time. Similarly, strictly, the description about the case in which the instruction fetch access request signal /REQF, the operand access request signal /REQO and the internal chip select signal int/CS attain the low (L) level at the same time corresponds to the case in which the instruction fetch access request signal /REQF, the operand access request signal /REQO and the locked chip select signal /CSL attain the low (L) level at the same time, due to delays in the inverter 162f and the composite gate circuit 162h in the interlock circuit 162.

Furthermore, the memory controller 160 includes a hold control circuit 163 which receives the instruction fetch access address signal AF, the operand access address signal AO, the instruction fetch access request signal /REQF, the operand access request signal /REQO and the locked hold request signal /HREQL and outputs the internal hold acknowledge signal int/HACK. The hold control circuit 163 also outputs an instruction fetch timing detecting signal FLF for indicating which of the locked hold request signal /HREQL and the instruction fetch access request signal /REQF has attained the low (L) level earlier, an operand timing detecting signal FLO for indicating which of the locked hold request signal /HREQL and the operand access request signal /REQO has attained the low (L) level earlier, an instruction fetch external access detecting signal EADF for indicating whether the instruction fetch access address signal AF is specifying address in the external memory 400, and an operand external access detecting signal EADO for indicating whether the operand access address signal AO is specifying address of the external memory 400.

When the locked hold request signal /HREQL goes to the low (L) level earlier than the instruction fetch access request signal /REQF and the operand access request signal /REQO, or when the locked hold request signal /HREQL and one of the instruction fetch access request signal /REQF and the operand access request signal /REQO attain the low (L) level at the same time and the other attains the low (L) level at the same time or later, the hold control circuit 163 soon brings the internal hold acknowledge signal int/HACK to the low (L) level. Even if the locked hold request signal /HREQL attains the low (L) level later than the instruction fetch access request signal /REQF, if the instruction fetch access address signal AF does not specify an address of the external memory 400, that is, if the instruction fetch access is not to start an external bus cycle, the hold control circuit 163 soon brings the internal hold acknowledge signal int/HACK to the low (L) level.

Even if the locked hold request signal /HREQL attains the low (L) level later than the operand access request signal /REQO, if the operand access address signal AO does not specify an address of the external memory 400, that is to say, if the operand access is not to start an external bus cycle, the hold control circuit 163 soon brings the internal hold acknowledge signal int/HACK to the low (L) level. In other circumstances, even if the locked hold request signal /HREQL attains the low (L) level, the hold request control circuit 163 provides a standby to this request by not bringing the internal hold acknowledge signal int/HACK to the low (L) level soon, and brings the internal hold acknowledge signal int/HACK to the low (L) level after the instruction fetch access request signal /REQF or the operand access request signal /REQO, which had attained the low (L) level earlier, has attained the high (H) level.

When the instruction fetch access request signal /REQF attains the low (L) level earlier than the locked hold request signal /HREQL, the hold control circuit 163 brings the instruction fetch timing detecting signal FLF to the high (H) level, and when the instruction fetch access request signal /REQF attains the low (L) level later than or at the same time as the locked hold request signal /HREQL, it brings the instruction fetch timing detecting signal FLF to the low (L) level. When the operand access request signal /REQO attains the low (L) level earlier than the locked hold request signal /HREQL, the hold control circuit 163 brings the operand timing detecting signal FLO to the high (H) level, and when the operand access request signal /REQO attains the low (L) level later than or at the same time as the locked hold request signal /HREQL, it brings the operand timing detecting signal FLO to the low (L) level.

When the instruction fetch access address signal AF specifies an address of the external memory 400, the hold control circuit 163 brings the instruction fetch external access detecting signal EADF to the high (H) level, and if it does not, to the low (L) level. Furthermore, when the operand access address signal AO specifies an address of the external memory 400, the hold control circuit 163 brings the operand external access detecting signal EADO to the high (H) level, and if it does not to the low (L) level.

Also, the memory controller 160 includes an arbitration control circuit 164 which receives the instruction fetch access request signal /REQF, the operand access request signal /REQO, the locked hold request signal /HREQL, the locked chip select signal /CSL, the instruction fetch timing detecting signal FLF, the operand timing detecting signal FLO, the instruction fetch external access detecting signal EADF, and the operand external access detecting signal EADO, and outputs the instruction fetch access acknowledge signal /ACKF, the operand access acknowledge signal /ACKO, the instruction fetch access end signal/ENDF, the operand access end signal /ENDO, and the internal data complete signal int/DC.

When the instruction fetch access request signal /REQF goes to the low (L) level earlier than the operand access request signal /REQO and the instruction fetch timing detecting signal FLF is at the high (H) level indicting that the instruction fetch access request signal /REQF has attained the low (L) level earlier than the locked hold request signal /HREQL, the arbitration control circuit 164 soon causes the instruction fetch access acknowledge signal /ACKF to go to the low (L) level. At this time, even if the instruction fetch timing detecting signal FLF is at the low (L) level, if the instruction fetch external access detecting signal EADF is at the low (L) level indicating that an external bus cycle is not started and the instruction fetch access request signal /REQF has attained the low (L) level earlier than the locked chip select signal /CSL, it brings the instruction fetch access acknowledge signal /ACKF to the low (L) level soon. In other cases, even if the instruction fetch access request signal /REQF goes to the low (L) level, the arbitration control circuit 164 does not bring the instruction fetch access acknowledge signal /ACKF to the low (L) level soon to provide a standby to this request.

The arbitration control circuit 164 causes the instruction fetch access acknowledge signal /ACKF to go to the low (L) level, after the locked hold request signal /HREQL reaches the high (H) level when a standby was provided because the locked hold request signal /HREQL had reached the low (L) level earlier or at the same time, after the locked chip select signal /CSL attains the high (H) level when the standby was provided because the locked chip select signal /CSL had attained the low (L) level earlier or at the same time, and after the operand access request signal /REQO goes to the high (H) level when the standby was provided because the operand access request signal /REQO had attained the low (L) level earlier or at the same time.

When the operand access request signal /REQO has attained the low (L) level earlier than or at the same time as the instruction fetch access request signal /REQF and the operand timing detecting signal FLO is at the high (H) level indicting that the operand access request signal /REQO has reached the low (L) level earlier than the locked hold request signal /HREQL, the arbitration control circuit 164 soon brings the operand access acknowledge signal /ACKO to the low (L) level. At this time, even if the operand timing detecting signal FLO is at the low (L) level, if the operand external access detecting signal EADO is at the low (L) level indicating that an external bus cycle is not started and the operand access request signal /REQO has attained the low (L) level earlier than the locked chip select signal /CSL, it soon brings the operand access acknowledge signal /ACKO to the low (L) level. In other cases, even if the operand access request signal /REQO attains the low (L) level, the arbitration control circuit 164 does not bring the operand access acknowledge signal /ACKO to the low (L) level soon to provide a standby to this request.

The arbitration control circuit 164 causes the operand access acknowledge signal /ACKO to go to the low (L) level, after the locked hold request signal /HREQL goes to the high (H) level when the standby was provided because the locked hold request signal /HREQL had attained the low (L) level earlier or at the same time, after the locked chip select signal /CSL goes to the high (H) level when the standby was provided because the locked chip select signal /CSL had attained the low (L) level earlier or at the same time, and after the instruction fetch access request signal /REQF goes to the high (H) level when the standby was provided because the instruction fetch access request signal /REQF had attained the low (L) level earlier.

When the locked chip select signal /CSL goes to the low (L) level earlier than or at the same time as the instruction fetch access request signal /REQF and the operand access request signal /REQO, the arbitration control circuit 164 brings the internal data complete signal int/DC to the low (L) level, seeing when the cycle time of the built-in DRAM 120 or the cache memory 130 passes, while maintaining the instruction fetch access acknowledge signal /ACKF and the operand access acknowledge signal /ACKO at the high (H) level. Even if the locked chip select signal /CSL attained the low (L) level later than the instruction fetch access request signal /REQF or the operand access request signal /REQO, if the external access detecting signal EADF or EADO corresponding to the instruction fetch access request signal /REQF or the operand access request signal /REQO, which has attained the low (L) level earlier, is at the high (H) level indicative of starting an external bus cycle and therefore a standby has been provided as the result of arbitration with the locked hold request signal /HREQL to maintain the instruction fetch access acknowledge signal /ACKF or the operand access acknowledge signal /ACKO at the high (H) level, the arbitration control circuit 164 brings the internal data complete signal int/DC to the low (L) level, as well, seeing when the cycle time of the built-in DRAM 120 or the cache memory 130 passes.

When the arbitration control circuit 164 has brought the instruction fetch access acknowledge signal /ACKF to the low (L) level, it brings the instruction fetch access end signal /ENDF to the low (L) level, according to the internal data complete signal int/DC if the instruction fetch external access detecting signal EADF is at the high (H) level, or seeing when the cycle time of the built-in DRAM 120 or the cache memory 130 passes if it is at the low (L) level. When having brought the operand access acknowledge signal /ACKO to the low (L) level, if the operand external access detecting signal EADO is at the high (H) level, the arbitration control circuit 164 brings the operand access end signal /ENDO to the low (L) level according to the internal data complete signal int/DC, and if it is at the low (L) level, seeing when the cycle time of the built-in DRAM 120 or the cache memory 130 passes.

Figure 5:
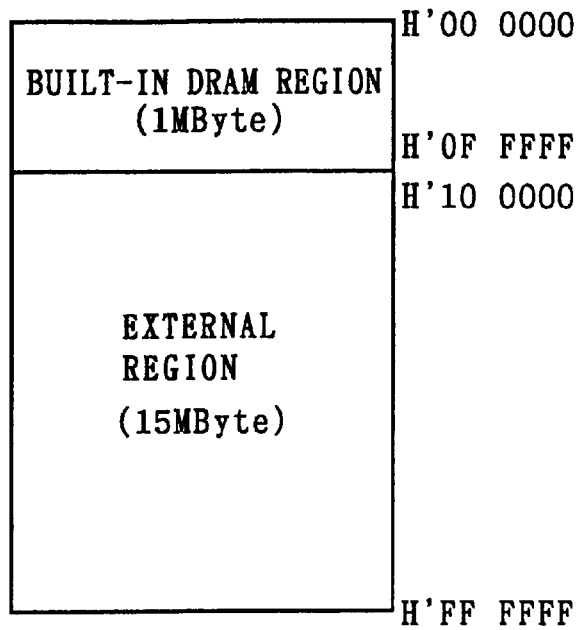
FIG. 5 is a diagram showing the address space of the microprocessor of a preferred embodiment of the present invention.
Figure 5:
Figure 5:
Figure 5:
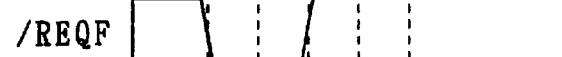
Figure 5:
Figure 5:
Figure 5:

Next, the address space will be described. Referring to FIG. 5, the user-available region in the user space of the microprocessor 100 is the 16 MBytes from the physical address H'00 0000 to H'FF FFFF. In this region, the 1-MByte region from H'00 0000 to H'0F FFFF is the built-in DRAM region. The address is handled in a 32-bit width.

Next, operations of the microprocessor 100 for transferring instructions and transferring operands, object data of execution of the instructions, will be described. First, the instruction fetch access in which the CPU 110 fetches instruction will be described. Referring to FIG. 1, FIG. 2 and FIG. 3, when the instruction to be fetched exists in the cache memory 130, which corresponds to a cache hit, four 32 bit instruction codes totaling 128 bits are transferred from the cache memory 130 to the instruction queue 110a in the CPU 110 through the internal data bus 170. When the instruction to be fetched by the CPU 110 does not exist in the cache memory 130 but exists in the built-in DRAM 120, the instruction codes for 128 bits are transferred from the built-in DRAM 120 to the instruction queue 110a in the CPU 110 through the internal data bus 170. If the instruction to be fetched by the CPU 110 does not exist in the cache memory 130 or in the built-in DRAM 120, but exists in the external memory 400, the instruction codes are stored in the 128-bit data buffer 150h in the external bus interface unit 150 from the external memory 400 through the external data bus 500.

There are three ways of storing data in the data buffer 150h. First, the instruction is captured twice, 16 bits at a time, and one desired 32-bit instruction code is stored in the data buffer 150h. Second, starting from one desired 32-bit instruction code, the instruction codes to the boundary of the data buffer 150h are stored in the data buffer 150h. In this case, when a desired 32-bit instruction code is captured in the leading address portion of the data buffer 150h, the remaining three instruction codes for 96 bits to the boundary of the data buffer 150h are subsequently captured in the data buffer 150h. That is to say, the instruction is captured from the external data bus 500 eight times, 16 bits at a time. When a desired 32-bit instruction code is captured in the second address portion from the head in the data buffer 150h, the remaining two instruction codes for 64 bits to the boundary of the data buffer 150h are subsequently captured into the data buffer 150h. That is to say, the instruction is captured from the external data bus 500 six times, 16 bits at a time.

Similarly, when a desired 32-bit instruction code is captured in the third address portion of the data buffer 150h, the remaining one instruction code for 32 bits to the boundary of the data buffer 150h is subsequently captured in the data buffer 150h. That is to say, the instruction is captured from the external data bus 500 four times, 16 bits at a time. When a desired 32-bit instruction code is captured into the last address portion in the data buffer 150h, no instruction code is subsequently captured. That is to say, the instruction is captured from the external data bus 500 twice, 16 bits at a time. Third, the four instruction codes for 128 bits, including one desired 32-bit instruction code, are stored in the data buffer 150h. In this case, the data buffer 150h captures the instruction codes eight times, 16 bits at a time, from the external data bus 500. Then the instruction codes stored in the data buffer 150h in the external bus interface 150 are transferred to the instruction queue 110a in the CPU 110 through the internal data bus 170.

Next, the operand read access in which the CPU 110 reads operand will be described. If the operand which the CPU 110 needs exists at address in the built-in DRAM region, the 128-bit data including the necessary operand is transferred from the cache memory 130 or the built-in DRAM 120 to the data selector 110i in the CPU 110 through the internal data bus 170. The data selector 110i transfers the necessary operand of 32 bits from the 128-bit data to circuitry in the CPU 110. If the operand that the CPU 110 requires exists at address in the external memory 400, the desired 32-bit operand is stored in the data buffer 150h in the external bus interface unit 150 from the external data bus 500, which is transferred to the data selector 110i in the CPU 110 through the internal data bus 170.

Next, the operand write access in which the CPU 110 writes operand will be described. First, the 32-bit operand outputted from the CPU 110 is provided to the data selector 110i. The data selector 110i transfers the 32-bit operand from the CPU 110 to 32 of the 128 internal data bus 170. When this operand is to be written at address in the built-in DRAM region, the operand is written in the cache memory 130 or the built-in DRAM 120 through the internal data bus 170. When this operand is to be written in the external memory 400, the operand is stored in the data buffer 150h in the external bus interface unit 150 through the internal data bus 170 and then transferred to the external data bus 500, 16 bits at a time.

Next, the external bus master read access in which the external bus master 300 reads operand existing at address in the built-in DRAM region will be explained. First, 128-bit data including the desired operand is transferred to and stored in the data buffer 150*h* in the external bus interface unit 150 through the internal data bus 170 from the cache memory 130 or the built-in DRAM 120. Subsequently, the operand stored in the data buffer 150*h* is transferred to the external data bus 500, 16 bits at a time. Then the external bus master 300 receives the operand transferred through the external data bus 500.

Next, the external bus master write access in which the external bus master 300 writes operand at address in the built-in DRAM region will be explained. First data is transferred by 16 bits from the external bus master 300 to the data buffer 150*h* in the external bus interface unit 150 through the external data bus 500 and stored in the data buffer 105*h*. Then the data stored in the data buffer 150*h* is written in the cache memory 130 or the built-in DRAM 120 through the internal data bus 170.

Next, the access operation to the cache memory 120 or to the built-in DRAM will be described in detail. First the protocol of the instruction fetch access in which the CPU 110 reads data from the cache memory 130 or the built-in DRAM 120 will be explained referring to FIG. 6. First, at time t1, the instruction queue 110*a* in the CPU 110 brings the instruction fetch request signal /REQF to the low (L) level and the program counter 110*c* in the CPU 110 changes the instruction fetch access address signal AF to an address specifying the built-in DRAM region, and then the memory controller 160 responds to this request and brings the instruction fetch access acknowledge signal /ACKF to the low (L) level at time t2. Then, the memory controller 160 places the control signal CTRLC or CTRLD to the cache memory 130 or the built-in DRAM 120, respectively, in a read specifying state (not shown). Then data from the cache memory 130 or the built-in DRAM 120 is outputted as the internal data intD[0:127] onto the internal data bus 170 at time t3, where it is fetched by the CPU 110. The memory controller 160 causes the instruction fetch access end signal /ENDF to go to the low (L) level at time t3.

Second, the protocol of the operand read access in which the CPU 110 reads data from the cache memory 130 or the built-in DRAM 120 will be described referring to FIG. 7. First, at time t1, the CPU control circuit 110*j* in the CPU 110 causes the operand access request signal /REQO to go to the low (L) level and changes the operand access address signal AO to an address specifying the built-in DRAM region, and then the memory controller 160, in response to this request, causes the operand access acknowledge signal ACKO to go to the low (L) level at time t2. Subsequently, the memory controller 160 puts the control signal CTRLC or CTRLD to the cache memory 130 or the built-in DRAM 120, respectively, in a read specifying state (not shown). Then data from the cache memory 130 or the built-in DRAM 120 is outputted as the internal data intD[0:127] onto the internal data bus 170 at time t3, where it is fetched by the CPU 110. The memory controller 160 forces the operand access end signal /ENDO to the low (L) level at time t3.

Third, the protocol of the operand write access in which the CPU 110 writes data in the cache memory 130 or the built-in DRAM 120 will be described referring to FIG. 8. First, the CPU control circuit 110*j* in the CPU 110 brings the operand access request signal /REQO to the low (L) level at time t1 and changes the operand access address signal AO to an address specifying the built-in DRAM region, and then the memory controller 160, in response to this request, brings the operand access acknowledge signal /ACKO to the low (L) level at time t2. Then the CPU 110 outputs write data as the internal data intD[0:127] onto the internal data bus 170. Subsequently, the memory controller 160 places the control signal CTRLC or CTRLD to the cache memory 130 or the built-in DRAM 120, respectively, in a write specifying state (not shown). Then the data from the internal data bus 170 is written in the cache memory 130 or the built-in DRAM 120. The memory controller 160 brings the operand access end signal /ENDO to the low (L) level at time t5.

Fourth, the protocol of the external bus master read access in which the external bus master 300 reads data from the cache memory 130 or the built-in DRAM 120 will be described referring to FIG. 9. First, the external bus controller 200 brings the hold request signal /HREQ to the low (L) level at time t1 in response to the request from the external bus master 300. In response, the microprocessor 100 causes the hold acknowledge signal /HACK to go to the low (L) level at time t2. Then the external bus controller 200 brings the chip select signal /CS to the low (L) level at time t3, changes the address signal A[8:30] to an address of the destination, and brings the read/write signal R/W to the high (H) level. Then the memory controller 160 in the CPU 110 puts the control signal CTRLC or CTRLD to the cache memory 130 or the built-in DRAM 120, respectively, in a read specifying state (not shown).

Subsequently, the internal data intD[0:127] is outputted from the cache memory 130 or the built-in DRAM 120 onto the internal data bus 170, and captured and stored in the external bus interface unit 150, which data is outputted onto the external data bus 500 as the external data extD[0:15] at each of the times t6, t8, t10, and t12, 16 bits at a time. The data complete signal /DC is forced to the low (L) level at time t6.

Fifth, the protocol of the external bus master write access in which the external bus master 300 writes data in the cache memory 130 or the built-in DRAM 120 will be explained referring to FIG. 10. First, in response to a request from the external bus master 300, the external bus controller 200 forces the hold request signal /HREQ to the low (L) level at time t1. In response, the microprocessor 100 brings the hold acknowledge signal /HACK to the low (L) level at time t2. Then the external bus controller 200 brings the chip select signal /CS to the low (L) level at time t3, changes the address signal A[8:30] to an address of the destination, and brings the read/write signal R/W to the low (L) level, and the external bus master 300 provides the write data as the external data extD[0:15].

The write data outputted from the external bus master 300 is stored by 16 bits in the data buffer 150*h* in the external bus interface unit 150 in the microprocessor 100. To give notice to outside that the data on the external data bus 500 has been stored in the data buffer 150*h*, the microprocessor 100 brings the data complete signal /DC to the low (L) level at time t4. When the chip select signal /CS is brought to the high (H) level at time t11 and the read/write signal R/W is at the low (L) level, the memory controller 160 places the control signal CTRLC or CTRLD in a write specifying state to the cache memory 130 or the built-in DRAM 120.

Subsequently, the write data captured and stored in the external bus interface unit 150 is outputted onto the internal data bus 170 and the data on the internal data bus 170 is stored in the cache memory 130 or the built-in DRAM 120.

Next, the case in which accesses from the CPU 110 and the external bus master 300 compete will be described. Referring to FIG. 11, when an access request from the CPU 110 and an access request from the external bus master 300 simultaneously occur, as in the case in which the operand access request signal /REQO and the chip select signal /CS have attained the low (L) level at the same time, for example, the access request from the external bus master 300 is preferentially processed first by control by the memory controller 160, and then the request from the CPU 110 is processed. Referring to FIG. 12, when an access request from the CPU 110 occurs earlier than an access request from the external bus master 300, as in the case in which the operand access request signal /REQO attains the low (L) level earlier than the chip select signal /CS, the access request from the CPU 110 is first processed by control by the memory controller 160 and then the request from the external bus master 300 is processed. When an access request from the external bus master 300 occurs earlier, those are processed in the reverse order.

Next, the interlock access by the CPU 110 will be described. First, the protocol of the interlock access for the case in which the hold exclusive lock mode is set will be described referring to FIG. 13. The CPU 110 places the lock signal /LOCK at the low (L) level in the period from execution of the interlocked load instruction to execution of the interlocked store instruction. In the period from when the memory controller 160 brings the operand access acknowledge signal /ACKO to the low (L) level in response to the operand access request by the interlocked load instruction to when it brings the operand access acknowledge signal /ACKO to the low (L) level in response to the operand access request by the locked store instruction, it ignores the hold request signal /HREQ provided from outside, even if it attains the low (L) level. Accordingly, in the interlock access period by the CPU 110, the bus right of the external data bus 500 is not freed to the external bus master 300. Then, after performing the store processing with the locked store instruction, the memory controller 160 accepts the hold request.

Furthermore, the protocol of the interlock access in which the chip select exclusive lock mode is set will be described referring to FIG. 14. The CPU 110 places the lock signal /LOCK at the low (L) level in the period from execution of the interlocked load instruction to execution of the interlocked store instruction. In the period from when the memory controller 160 brings the operand access acknowledge signal /ACKO to the low (L) level in response to the operand access request by the interlocked load instruction to when it brings the operand access acknowledge signal /ACKO to the low (L) level in response to the operand access request by the locked store instruction, it ignores the chip select signal /CS provided from outside, even if it attains the low (L) level. Accordingly, in the interlock access period by the CPU 110, access by the external bus master 300 to the built-in DRAM region is not made. Then, after performing the store processing with the locked store instruction, the memory controller 160 accepts the access request from the external bus master 300.

As described above, the microprocessor 100 according to the first preferred embodiment includes the CPU 110, the built-in DRAM 120, and the memory controller 160 which controls the interlock access by the CPU 110 to the built-in DRAM 120 so that the CPU 110 can make interlock access. Accordingly, the CPU 110 can make read-modify-write access in an undivided manner without being interfered with by access to the built-in DRAM 120 from outside. This solves the problem of access contention caused because the built-in DRAM 120 and the CPU 110 are provided on one chip, which allows the built-in DRAM 120 to be utilized as a shared memory with the outside.

Particularly, in systems in which values of the semaphore are stored in the built-in DRAM region, this solves the problem that rewrite is provided from outside while the CPU 110 reads the value of the semaphore and rewrites the value. Also in other cases, when a built-in DRAM region is used as a shared memory, this allows the CPU 110 to perform a series of processes while excluding access requests from outside.

Furthermore, since it is possible to switch between the hold exclusive lock mode and the chip select exclusive lock mode, the most suitable lock mode can be set depending on the system.

While the invention has been described in detail, the foregoing description is in all aspects illustrative and not restrictive. It is understood that numerous other modifications and variations can be devised without departing from the scope of the invention.

We claim:

1. A semiconductor device comprising one chip:

a memory for storing data;

a central processing unit (CPU) for making interlock access and non-interlock access to said memory; and a control circuit for receiving a request signal comprising a chip select signal for requesting access to said memory from outside said chip and outputting a response signal comprising a data complete signal for indicating that access to said memory from outside said chip has been completed, to respond to said request signal, wherein:

when said CPU makes interlock access to said memory, said control circuit causes said data complete signal to indicate that access to said memory from outside is excluded; and when said CPU makes non-interlock access to said memory and said chip select signal indicates that access to said memory is requested from outside said chip, in response to said chip select signal.

2. The semiconductor device according to claim 1, wherein said CPU starts the interlock access when receiving an interlock access instruction and terminates the interlock access when receiving an interlock access terminate instruction.

3. The semiconductor device according to claim 1, wherein said CPU makes non-interlock access to said memory, wherein:

said request signal comprises a hold request signal for requesting a bus right;

said response signal comprises a hold acknowledge signal for indicating that said bus right is available;

when said CPU makes non-interlock access to said memory and said hold request signal indicates that said bus right is being requested, said control circuit causes said hold acknowledge signal to indicate that said bus right is available; and when said CPU makes interlock access to said memory, said control circuit causes said hold acknowledge signal to indicate that said bus right is not available, thereby excluding access from outside the chip to said memory.

4. A semiconductor device comprising on one chip:

a memory for storing data;

a central processing unit (CPU) for making interlock access and non-interlock access to said memory; and a control circuit for receiving a request signal for accessing said memory from outside said chip and outputting a response signal to respond to said request signal, said response signal comprising a hold acknowledge signal for giving notice that said bus right has been freed and a data complete signal for giving notice that the access to said memory from outside has been completed, and said response signal comprising a hold request signal for requesting a bus right and a chip select signal for requesting access to said memory from outside, wherein;

when said CPU makes interlock access to said memory, said response signal indicates that access to said memory from outside is excluded and when said CPU makes non-interlock access to said memory, said response signal indicates that access to said memory from outside is not excluded; and said control circuit has a first lock mode and a second lock mode which are switchable;

in said first lock mode, at a time of non-interlock access in said CPU, said control circuit is responsive to said hold request signal at a level indicating that said bus right is requested to cause said hold acknowledge signal to be at a first response level indicating that said bus right has been freed, and in the interlock access period in said CPU, said control circuit causes said hold acknowledge signal to be at a different level from said first response level to place said response signal in the state indicating that access to said memory from outside is excluded; and in said second lock mode, at a time of non-interlock access in said CPU, said control circuit is responsive to said chip select signal at a level indicating that access to said memory from outside is requested to cause said data complete signal to be at a second response level indicating that the access to said memory from outside has been completed, and in the interlock access period in said CPU, causes said data complete signal to be at a level different from said second response level to place said response signal in the state indicating that access to said memory from outside is excluded.

\* \* \* \* \*